United States Patent
Nielsen

(12) 
(10) Patent No.: US 12,551,477 B2
(45) Date of Patent: Feb. 17, 2026

(54) ORAL ANTAGONIST COMPOSITIONS FOR NICOTINE BURNING RELIEF

(71) Applicant: Fertin Pharma A/S, Vejle (DK)

(72) Inventor: Kent Albin Nielsen, Brande (DK)

(73) Assignee: Fertin Pharma A/S, Vejle (DK)

( * ) Notice: Subject to any disclaimer, the term of this patent is extended or adjusted under 35 U.S.C. 154(b) by 0 days.

(21) Appl. No.: 17/028,002

(22) Filed: Sep. 22, 2020

(65) Prior Publication Data

US 2022/0087997 A1    Mar. 24, 2022

(51) Int. Cl.

| | |
|---|---|
| A61K 31/465 | (2006.01) |
| A61K 9/00 | (2006.01) |
| A61K 9/20 | (2006.01) |
| A61K 31/045 | (2006.01) |
| A61K 31/05 | (2006.01) |
| A61K 31/125 | (2006.01) |
| A61K 31/16 | (2006.01) |
| A61K 31/167 | (2006.01) |
| A61K 36/45 | (2006.01) |
| A61K 47/02 | (2006.01) |
| A61K 47/26 | (2006.01) |
| A61K 47/32 | (2006.01) |
| A61K 47/38 | (2006.01) |
| A61P 23/02 | (2006.01) |

(52) U.S. Cl.
CPC ............ *A61K 31/465* (2013.01); *A61K 9/006* (2013.01); *A61K 9/2072* (2013.01); *A61K 31/045* (2013.01); *A61K 31/05* (2013.01); *A61K 31/125* (2013.01); *A61K 31/16* (2013.01); *A61K 31/167* (2013.01); *A61K 36/45* (2013.01); *A61K 47/02* (2013.01); *A61K 47/26* (2013.01); *A61K 47/32* (2013.01); *A61K 47/38* (2013.01); *A61P 23/02* (2018.01)

(58) Field of Classification Search
CPC .... A61K 31/465; A61K 9/006; A61K 9/2072; A61K 31/045; A61K 31/05; A61K 31/125; A61K 31/16; A61K 31/167; A61K 31/352; A61K 36/45; A61K 47/02; A61K 47/26; A61K 47/32; A61K 47/38; A61P 23/02

See application file for complete search history.

(56) References Cited

U.S. PATENT DOCUMENTS

| | | | |
|---|---|---|---|
| 8,952,038 B2 | 2/2015 | Kobal et al. | |
| 10,201,180 B2 | 2/2019 | Kobal et al. | |
| 2004/0020503 A1* | 2/2004 | Williams ............... | A24B 15/30 131/352 |
| 2006/0141031 A1* | 6/2006 | Nelson .................... | A61P 11/00 424/464 |
| 2007/0148283 A1* | 6/2007 | Harvey ............... | A23L 27/2054 426/3 |
| 2012/0052021 A1* | 3/2012 | Kobal .................... | A24B 15/10 424/48 |
| 2013/0098377 A1* | 4/2013 | Borschke ................ | A61P 25/26 514/343 |
| 2014/0261485 A1 | 9/2014 | Kobal et al. | |
| 2014/0271946 A1 | 9/2014 | Kobal et al. | |
| 2014/0335224 A1 | 11/2014 | Asche et al. | |

FOREIGN PATENT DOCUMENTS

| | | |
|---|---|---|
| EP | 2614860 A2 | 7/2013 |
| KR | 20070066439 A | 6/2007 |
| WO | WO2011117735 A2 | 9/2011 |

OTHER PUBLICATIONS

Liu et al. "TRPM8 is the Principle Mediator of Menthol-induced Analgesia of Acute and Inflammation Pain." Pain, Author manuscript; available in PMC Oct. 1, 2014, pp. 1-19. (Year: 2014).*

Beigi et al. "Quantity and chemical composition of essential oil of peppermint (*Mentha* x *piperita* L.) leaves under different drying methods." International Journal of Food Properties, 2018, 21:1, 267-376. (Year: 2018).*

* cited by examiner

*Primary Examiner* — Doan T Phan
(74) *Attorney, Agent, or Firm* — Forge IP, PLLC

(57) ABSTRACT

The invention relates to oral analgesic compositions for alleviation of perceived nicotine irritation through inhibition or blocking of nicotine activated receptors or ion channels in the gastrointestinal tract, including the oral cavity. The composition of the invention comprises one or more nicotine sources, one or more buffering agents, and at least two antagonists in an effective amount to inhibit or block nicotine agonist activation of Nicotinic Acetylcholine Receptors (nAChR) and/or Transient Receptor Potential (TRP) ion channels, the at least two antagonists being selected from the group consisting of a first antagonist comprising camphor or one or more compounds resembling camphor, a second antagonist comprising eucalyptol, and a third antagonist comprising (1R,2S,5R)—N-(4-Methoxyphenyl)-5-methyl-2-(1-methylethyl)cyclohexanecarboxamide (WS-12).

18 Claims, 6 Drawing Sheets

ORAL ANTAGONIST COMPOSITIONS FOR NICOTINE BURNING RELIEF

FIELD OF THE INVENTION

The present invention relates to the field of analgesic compositions useful for alleviation of nicotine irritation during or after oral intake. More specifically, the present invention pertains to inhibition or blocking of nicotine activated receptors or ion channels in the gastrointestinal tract.

BACKGROUND OF THE INVENTION

Nicotine is a well known, highly characterized alkaloid that can be isolated from the dried leaves of *Nicotiana tabacum*. Its numerous commercial uses include incorporation in fumigants and insecticides. The compound is therapeutically valuable in the treatment of the smoking withdrawal syndrome. This treatment is based on administration of nicotine under controlled conditions with gradual decrease of nicotine strength.

However, various short-term disadvantages are associated with oral intake of nicotine due to the chemical nature of the compound. Nicotine irritation during oral intake, such as nicotine burning or hiccups, is a well-known discomfort associated with nicotine cessation therapy.

The main receptors and ion channels involved in the uptake of nicotine in the gastrointestinal tract are reported to involve Nicotinic Acetylcholine Receptors (nAChR) and Transient Receptor Potential (TRP) ion channels. More specifically, receptors and ion channels reported to be activated by nicotine include Nicotinic Acetylcholine Receptors (nAChR), Transient Receptor Potential Vanilloid Type 1 (TRPV1) ion channels, Transient Receptor Potential Ankyrin 1 (TRPA1) ion channels and Transient Receptor Potential Melastatin 8 (TRPM8) ion channels.

Various attempts have been made in order to circumvent the discomfort associated with nicotine in oral compositions. Some of these attempts include taste masking by adding a relatively high amount of sugar or sugar alcohol to achieve a pleasant taste that can mask nicotine irritation. Other attempts include unspecific addition of flavoring agents with the aim of obtaining a taste profile that masks the drawbacks of nicotine. Still other attempts include inclusion of unspecific cooling agents in oral compositions that work to distract the perception of nicotine irritation.

Common to these efforts of nicotine masking is that they are not directed to the specific nicotine activated receptors involved in nicotine uptake and hence are not optimized for the targets that are involved in nicotine irritation. The consequence is that attempts of unspecific taste masking typically result in less efficient reduction of nicotine irritation, and often do not affect the problems caused by nicotine interaction with nicotine activated receptors, such as burning or hiccups.

Additionally, side effect may be associated with masking nicotine. For instance, use of excess amount of sugar alcohol to mask nicotine irritation may involve laxative side effects.

Also, use of unspecific flavoring agents may result in discomfort in flavor perception, such as discomfort from the flavor itself that can be more inconvenient than nicotine irritation.

While the prior art solutions generally comply with masking of inconvenient nicotine irritation, there is still a need in the art for more specific targeted oral compositions that can reduce nicotine irritation to a significant degree without the drawbacks of the prior art.

Particularly, there is a need for oral compositions that can reduce nicotine irritation without increasing adverse side effects from presence of unspecific flavoring agents.

SUMMARY OF THE INVENTION

In a first aspect, the present invention pertains to an oral analgesic composition for alleviation of perceived nicotine irritation through inhibition or blocking of nicotine activated receptors or ion channels in the gastrointestinal tract, including the oral cavity, where the composition comprises one or more nicotine sources, one or more buffering agents, and at least two antagonists in an effective amount to inhibit or block nicotine agonist activation of Nicotinic Acetylcholine Receptors (nAChR) and/or Transient Receptor Potential (TRP) ion channels. In this first aspect, the at least two antagonists are selected from the group consisting of a first antagonist comprising camphor or one or more compounds resembling camphor, a second antagonist comprising eucalyptol, and a third antagonist comprising (1R,2S,5R)—N-(4-Methoxyphenyl)-5-methyl-2-(1-methylethyl)cyclohexanecarboxamide also known as WS-12.

In a second aspect, the present invention pertains to an oral analgesic composition for alleviation of perceived nicotine irritation through inhibition or blocking of nicotine activated receptors or ion channels in the gastrointestinal tract, including the oral cavity. In this second aspect, the composition comprises one or more nicotine sources, one or more buffering agents, and at least two antagonists in an effective amount to inhibit or block nicotine agonist activation of Nicotinic Acetylcholine Receptors (nAChR) and/or Transient Receptor Potential (TRP) ion channels. In the second aspect, the at least two antagonists may be selected from a first antagonist, a second antagonist and a third antagonist.

In a third aspect, the present invention pertains to an oral analgesic composition for alleviation of perceived nicotine irritation through inhibition or blocking of nicotine activated receptors or ion channels in the gastrointestinal tract, including the oral cavity. In this third aspect, the composition comprises at least three antagonists in an effective amount to inhibit or block nicotine agonist activation of Nicotinic Acetylcholine Receptors (nAChR) and/or Transient Receptor Potential (TRP) ion channels. In the third aspect, the at least three antagonists may be selected from a first antagonist, a second antagonist and a third antagonist.

Generally, the invention aims at providing specific oral analgesic compositions that may alleviate perceived irritation associated with active pharmaceutical ingredients, such as nicotine, through inhibition or blocking of nicotine activated receptors or ion channels in the gastrointestinal tract. The solution involves incorporation of effective amounts of at least two antagonists, such as three antagonists. While provision of only one antagonist is known from the prior art, the present invention aims at providing a synergy in alleviating irritation from pharmaceutical compounds, such as nicotine, by at least two antagonists in effective amounts without the drawbacks of the prior art.

Specifically, the antagonists provided in the present invention may work on targeted receptors or ion channels and typically involve different receptors or ion channels for the individual antagonists applied to give a more sophisticated alleviation of perceived irritation. Compared to the prior art solutions, the present invention may alleviate irritation from pharmaceutical compounds, such as nicotine, and at the same time reduce one or more of the side effects of known compositions. These side effects may include inconvenient perception of the antagonist itself that in some instances may be more pronounced than irritation from the pharmaceutical compound, particularly when high concentration of the antagonist is needed to reduce irritation from the pharmaceutical compound.

One of the advantages associated with the present invention is a significant reduction in nicotine irritation, such as burning and hiccups, involved in oral administration of nicotine compositions, for instance during nicotine cessation therapy. Nicotine cessation thearapy may involve administration of nicotine chewing gum, fast disintegrating tablets (FDT) including nicotine, pouches containing effective amounts of nicotine compounds, such as free nicotine, or nicotine mouth spray.

Reduction of nicotine irritation by the present invention may also address one or more of the drawbacks of the prior art solutions related to taste masking of nicotine by providing oral analgesic compostions directed to the specific nicotine activated receptors involved in nicotine uptake and hence providing more optimized solutions for the gastrointestical targets, such as the oral mucosa.

Side effects of the prior art addressed by the present invention may involve reduction of laxative side effects by excess use of sugar or sugar alcohol to mask nicotine irritation. Additionally, the present invention may address use of unspecific flavoring agents that may result in discomfort in flavor perception, such as discomfort from the flavor itself that can be more inconvenient than nicotine irritation, particularly when a higher flavor concentration is needed for reducing nicotine irritation.

More particularly, the present invention may address discomfort from nicotine irritation, such as burning or hiccups, without increasing adverse side effects from presence of unspecific flavoring agents. Even more particularly, the present invention may reduce nicotine irritation, such as burning or hiccups, without increasing adverse side effects from presence of unspecific flavoring agents. Furthermore, the present invention may reduce nicotine irritation, such as burning or hiccups, without causing a higher antagonist perception.

Since the antagonists for a vast majority have an own taste that may cause antagonist perception involving huge discomfort in high concentrations, including eucalyptus and camphor, it was most surprising to the inventors that the combination of at least two antagonists according to the invention could reduce nicotine irritation without causing a higher antagonist perception. This advantage may appear even when the total amount of antagonists is higher than for compositions where only single antagonists are present.

The expectation of the inventors was that by adding a higher amount of antagonists, the antagonist perception would be significantly higher compared to situations where only single antagonists were applied. It was even more surprising that the nicotine irritation level was significantly reduced at the same time.

According to the invention, the combination of at least two antagonists is believed to work in synergy with nicotine for reducing nicotine irritation, such as burning.

Even more pronounced is the combination of three antagonists for reduction of nicotine irritation. The combination of at least three antagonists according to the invention was seen to provide the best results on reduction of nicotine irritation.

Accordingly, it appears that the combination of three antagonists also works in synergy with nicotine for reducing nicotine irritation, such as burning.

Further, the expectation of the inventors was that by adding a proportionate level of antagonists, the antagonist perception would be comparable with use of only single antagonists. However, it was surprising that also for a proportionate levels of antagonists, the nicotine irritation (burning) level was significantly reduced.

Accordingly, it appears that the combination of three antagonists also in this set-up works in synergy with nicotine for reducing nicotine irritation, such as burning.

According to the invention, at least two antagonists are present in the oral analgesic composition.

In some embodiments, the at least two antagonists comprise the first antagonist and the second antagonist.

In some embodiments, the at least two antagonists comprise the first antagonist and the second antagonist in a weight ratio of 1:20 to 1:1. In some further embodiments, the at least two antagonists comprise the first antagonist and the second antagonist in a weight ratio of 1:10 to 1:2. In some even further embodiments, the at least two antagonists comprise the first antagonist and the second antagonist in a weight ratio of 1:8 to 1:3.

In some embodiments, the at least two antagonists comprise the first antagonist and the third antagonist. In some embodiments, the at least two antagonists comprise the first antagonist and the third antagonist in a weight ratio of 1:20 to 1:1. In some further embodiments, the at least two antagonists comprise the first antagonist and the third antagonist in a weight ratio of 1:10 to 1:2. In some even further embodiments, the at least two antagonists comprise the first antagonist and the third antagonist in a weight ratio of 1:8 to 1:3.

In some embodiments, the at least two antagonists comprise the second antagonist and the third antagonist. In some embodiments, the at least two antagonists comprise the second antagonist and the third antagonist in a weight ratio of 1:4 to 4:1. In some further embodiments, the at least two antagonists comprise the second antagonist and the third antagonist in a weight ratio of 1:3 to 3:1. In some even further embodiments, the at least two antagonists comprise the second antagonist and the third antagonist in a weight ratio of 1:2 to 2:1.

According to the invention, at least two antagonists are present in the oral analgesic composition, such as at least three antagonists. The combination of at least three antagonists according to the invention was seen to provide the best results on reduction of nicotine irritation. Accordingly, it appears that the combination of three antagonists works in synergy with nicotine for reducing nicotine irritation, such as burning.

Further, the expectation of the inventors was that by adding a proportionate level of antagonists, the antagonist perception would be comparable with use of only single antagonists. However, it was surprising that also for a proportionate levels of antagonists, the nicotine irritation (burning) level was significantly reduced. Accordingly, it appears that the combination of three antagonists also in this set-up works in synergy with nicotine for reducing nicotine irritation, such as burning.

In some embodiments, the at least two antagonists comprise the first antagonist, the second antagonist and the third antagonist. In some embodiments, the at least two antagonists comprise the first antagonist, the second antagonist and the third antagonist in a weight ratio of 1:20:20 to 1:1:1. In some further embodiments, the at least two antagonists comprise the first antagonist, the second antagonist and the third antagonist in a weight ratio of 1:10:10 to 1:2:2. In some even further embodiments, the at least two antagonists comprise the first antagonist, the second antagonist and the third antagonist in a weight ratio of 1:8:8 to 1:3:3.

In some further embodiments, the at least two antagonists are present in a total amount of more than 0.5 mg, such as more than 1.0 mg, such as more than 1.5 mg. In some further embodiments, the at least two antagonists are present in a total amount of more than 1.5 mg, such as more than 2.0 mg, such as more than 2.5 mg.

In some embodiments, the at least two antagonists are present in a total amount effective to reduce peak perceived nicotine irritation in the oral cavity by more than 20% compared to presence of only one of the same at least two antagonists in the same total amount.

In the present context, the "total amount" refers to the combined amount of antagonists when at least two antagonists are present or the amount of only one of the same at least two antagonists. In either ways, the total amount in the comparison is the same, i.e. the total amount of for instance two antagonists is the same as for one single of the two antagonists.

In the present context, the wording "peak perceived nicotine irritation" refers to any peak point after oral administration with the highest perception of nicotine irritation.

The expectation of the inventors was that by adding a proportionate level of antagonists, the antagonist perception would be comparable with use of only single antagonists. However, it was surprising that also for a proportionate levels of antagonists, the nicotine irritation (burning) level was significantly reduced in some embodiments of the invention.

In other words, even when the total amount of the at least two antagonists is the same as the presence of only one of the same at least two antagonists, the nicotine irritation (burning) level was significantly reduced in some embodiments of the invention.

In some embodiments, the at least two antagonists are present in a total amount effective to reduce peak perceived nicotine irritation in the oral cavity by more than 30% compared to presence of only one of the same at least two antagonists in the same total amount.

In some embodiments, the at least two antagonists are present in a total amount effective to reduce peak perceived nicotine irritation during sublingual administration by more than 30% compared to presence of only one of the same at least two antagonists in the same total amount.

In some embodiments, the at least two antagonists are present in a total amount effective to reduce peak perceived nicotine irritation during sublingual administration by more than 50% compared to presence of only one of the same at least two antagonists in the same total amount.

In some embodiments, the at least two antagonists are present in a total amount effective to reduce peak perceived nicotine irritation in the throat by more than 30% compared to presence of only one of the same at least two antagonists in the same total amount.

In some embodiments, the at least two antagonists are present in a total amount effective to reduce peak perceived nicotine irritation in the throat by more than 50% compared to presence of only one of the same at least two antagonists in the same total amount.

In some embodiments, the at least two antagonists are present in a total amount of less than 3.0 mg. In some further embodiments, the at least two antagonists are present in a total amount of less than 2.5 mg. In some even further embodiments, the at least two antagonists are present in a total amount of less than 2.0 mg.

In some embodiments, the at least two antagonists are present in a total amount of less than 6.0 mg. In some further embodiments, the at least two antagonists are present in a total amount of less than 5.0 mg. In some even further embodiments, the at least two antagonists are present in a total amount of less than 4.0 mg.

In some embodiments, the at least two antagonists are present in a total amount effective to alleviate peak perceived nicotine irritation in the oral cavity and reducing peak antagonist perception by more than 30% compared to presence of only one of the same at least two antagonists in the same total amount.

In the present context, the "total amount" refers to the combined amount of antagonists when at least two antagonists are present or the amount of only one of the same at least two antagonists. In either ways, the total amount in the comparison is the same, i.e. the total amount of for instance two antagonists is the same as for one single of the two antagonists.

In the present context, the wording "peak perceived nicotine irritation" refers to any peak point after oral administration with the highest perception of nicotine irritation.

In the present context, the wording "reducing peak antagonist perception" refers to any peak point after oral administration with the highest perception of the antagonist.

The expectation of the inventors was that by adding a proportionate level of antagonists, the antagonist perception would be comparable with use of only single antagonists. However, it was surprising that also for a proportionate levels of antagonists, the antagonist perception level was significantly reduced in some embodiments of the invention.

In other words, even when the total amount of the at least two antagonists is the same as the presence of only one of the same at least two antagonists, the antagonist perception level was significantly reduced in some embodiments of the invention.

In some embodiments, the at least two antagonists are present in a total amount effective to alleviate peak perceived nicotine irritation during sublingual administration and reducing peak antagonist perception by more than 30% compared to presence of only one of the same at least two antagonists in the same total amount.

In some embodiments, the at least two antagonists are present in a total amount effective to alleviate peak perceived nicotine irritation in the throat and reducing peak antagonist perception by more than 30% compared to presence of only one of the same at least two antagonists in the same total amount.

In some embodiments, the first antagonist comprises an oil carrier. In some embodiments, the second antagonist comprises an oil carrier. In some embodiments, the first antagonist is camphor. In some embodiments, the first antagonist is a compound resembling camphor. In some embodiments, the one or more compounds resembling camphor is selected from the group consisting of 8 borneol, isoborneol, bornyl acetate, isobornyl acetate, mono-bornyl succinate, mono-isobornyl succinate, mono-bornyl formate, and mono-isobornyl formate. In some embodiments, the second antagonist is eucalyptol. In some embodiments, the third antagonist is WS-12.

In some embodiments, the at least two antagonists inhibit or block nicotine agonist activation of Nicotinic Acetylcholine Receptors (nAChR) and/or Transient Receptor Potential Vanilloid Type 1 (TRPV1) ion channels and/or Transient Receptor Potential Ankyrin 1 (TRPA1) ion channels and/or Transient Receptor Potential Melastatin 8 (TRPM8) ion channels.

In some embodiments, the at least two antagonists inhibit or block nicotine agonist activation of Nicotinic Acetylcholine Receptors (nAChR) and Transient Receptor Potential Vanilloid Type 1 (TRPV1) ion channels and Transient Receptor Potential Ankyrin 1 (TRPA1) ion channels and Transient Receptor Potential Melastatin 8 (TRPM8) ion channels.

In some embodiments, the at least two antagonists inhibit more than 20% nicotine agonist activation of Nicotinic Acetylcholine Receptors (nAChR) and/or Transient Receptor Potential Vanilloid Type 1 (TRPV1) ion channels and/or Transient Receptor Potential Ankyrin 1 (TRPA1) ion channels and/or Transient Receptor Potential Melastatin 8 (TRPM8) ion channels.

In some embodiments, the at least two antagonists block more than 20% nicotine agonist activation of Nicotinic Acetylcholine Receptors (nAChR) and/or Transient Receptor Potential Vanilloid Type 1 (TRPV1) ion channels and/or Transient Receptor Potential Ankyrin 1 (TRPA1) ion channels and/or Transient Receptor Potential Melastatin 8 (TRPM8) ion channels.

Without being bound by theory it is believed that the various receptors work in conjunction with nicotine activation, and that nicotine may work as full agonist or partial agonist for some or all of the receptors and ion channels. Also, without being bound by theory, it is believed that the various receptors work in conjunction with the antagonists according to the invention, and that the antagonists according to the invention may work to inhibit or block some or all of the receptors and ion channels to an extend involving complete blocking or inhibition of the receptors or less than complete blocking or inhibition of the receptors.

In the present context, the intention of the meaning of "more than 20%" is that nicotine activation is reduced by more than this percentage, which can be directly correlated to reduction of uptake of nicotine by more than this percentage.

In some embodiments, inhibition or blocking of nicotine activated receptors or ion channels in the gastrointestinal tract include the oral cavity, and perceived nicotine irritation includes burning.

In some embodiments, inhibition or blocking of nicotine activated receptors or ion channels in the gastrointestinal tract include lingual location, i.e. under the tongue, and perceived nicotine irritation includes burning.

In some embodiments, inhibition or blocking of nicotine activated receptors or ion channels in the gastrointestinal tract includes the throat, and perceived nicotine irritation include burning.

In the present context "nicotine irritation" is intended to mean discomfort associated with nicotine interaction of surfaces in the gastrointestinal tract. Discomfort typically occurs when nicotine interact with receptors or ion channels that may be activated by nicotine. Specifically, "nicotine irritation" includes various subcategories, such as "burning" or "hiccups". Typically, "burning" in the present context is intended to mean the perception of a burning sensation when nicotine is in contact with the mucosa in the oral cavity or in the throat. Typically, "hiccups" in the present context is intended to pertain to a physical interaction when nicotine is in contact with receptors in the mucosa in the stomach.

In some embodiments, inhibition or blocking of nicotine activated receptors or ion channels in the gastrointestinal tract includes the stomach, and perceived nicotine irritation includes hiccups.

In some embodiments, the one or more nicotine sources comprises nicotine. In some embodiments, the one or more nicotine sources comprises nicotine bitartrate. In some embodiments, the one or more nicotine sources comprises nicotine polacrilex resin. In some embodiments, the one or more nicotine sources comprises free base nicotine. In some embodiments, the one or more nicotine sources comprises a premix including free base nicotine and ion exchange resin. In some embodiments, the one or more nicotine sources comprises a premix including free base nicotine and polacrilex resin. In some embodiments, the one or more nicotine sources comprises tobacco.

In some embodiments, nicotine is present in an amount of 0.5 to 8.0 mg. In some embodiments, nicotine is present in an amount of 1.0 to 4.0 mg. In some embodiments, nicotine is present in an amount of 1.0 to 6.0 mg. In some embodiments, nicotine is present in an amount of 2.0 to 4.0 mg.

In some embodiments, the composition comprises the at least two antagonists and nicotine in a weight ratio of 1:4 to 4:1. In some embodiments, the composition comprises the at least two antagonists and nicotine in a weight ratio of 1:3 to 3:1. In some embodiments, the composition comprises the at least two antagonists and nicotine in a weight ratio of 1:2 to 2:1.

In some embodiments, the at least two antagonists are present in a total amount effective to reduce peak perceived nicotine irritation in the oral cavity by more than 20% without causing higher peak antagonist perception compared to presence of only one of the same single antagonists in the same individual amount.

Since the antagonists for a vast majority have an own taste that may cause antagonist perception involving huge discomfort in high concentrations, including *eucalyptus* and camphor, it was most surprising to the inventors that the combination of at least two antagonists according to the invention could reduce nicotine irritation without causing a higher antagonist perception. This advantage may appear even when the total amount of antagonists is higher than for compositions where only single antagonists are present.

The expectation of the inventors was that by adding a higher total amount of antagonists, the antagonist perception would be significantly higher compared to situations where only single antagonists were applied. It was even more surprising that the nicotine irritation level was significantly reduced at the same time.

In other words, even when the total amount of the at least two antagonists is higher, the antagonist perception level was significantly reduced in some embodiments of the invention.

In the present context, the "total amount" refers to the combined amount of antagonists when at least two antagonists are present contrary to "individual amount" which refers to the amount of either one of the at least two antagonists. The presence understanding is that if two antagonists are present, then each "individual amount" of the single antagonists adds up to the "total amount" used.

In the present context, the "peak perceived nicotine irritation" refers to any peak point after oral administration with the highest perception of nicotine irritation. In the present context, the "peak antagonist perception" refers to any peak point after oral administration with the highest antagonist perception.

In some embodiments, the at least two antagonists are present in a total amount effective to reduce peak perceived nicotine irritation in the oral cavity by more than 30% without causing higher peak antagonist perception compared to presence of only one of the same single antagonists in the same individual amount.

In some embodiments, the at least two antagonists are present in a total amount effective to reduce peak perceived nicotine irritation during sublingual administration by more than 20% without causing higher peak antagonist perception compared to presence of only one of the same single antagonists in the same individual amount.

In some embodiments, the at least two antagonists are present in a total amount effective to reduce peak perceived nicotine irritation during sublingual administration by more than 30% without causing higher peak antagonist perception compared to presence of only one of the same single antagonists in the same individual amount.

In some embodiments, the at least two antagonists are present in a total amount effective to reduce peak perceived nicotine irritation in the throat by more than 20% without causing higher peak antagonist perception compared to presence of only one of the same single antagonists in the same individual amount.

In some embodiments, the at least two antagonists are present in a total amount effective to reduce peak perceived nicotine irritation in the throat by more than 30% without causing higher peak antagonist perception compared to presence of only one of the same single antagonists in the same individual amount.

In some embodiments, the one or more buffering agents is selected from the group consisting of tri(hydroxymethyl) aminomethane buffering agents, phosphate buffering agents, carbonate buffering agents, and combinations thereof. In some embodiments, the buffering agent is present in an amount of 1.0 to 5.0% by weight of the composition.

In some embodiments, the composition comprises one or more sugar alcohol particles in an amount of at least 40% by weight of the composition. In some embodiments, the composition comprises one or more sugar alcohol particles in an amount of at least 60% by weight of the composition.

In some embodiments, the composition comprises one or more sugar alcohol particles comprising sugar alcohols selected from sorbitol, erythritol, xylitol, lactitol, maltitol, mannitol, isomalt, and combinations thereof.

In some embodiments, the composition comprises one or more sugar alcohol particles comprising directly compressible (DC) and non-directly compressible (non-DC) sugar alcohol particles.

In some embodiments, the composition comprises one or more sugar alcohol particles comprising non-DC sugar alcohol particles in an amount of at least 30% by weight of the composition. In some embodiments, the composition comprises one or more sugar alcohol particles comprising non-DC sugar alcohol particles selected from non-DC particles of erythritol, maltitol, xylitol, isomalt, and combinations thereof.

In some embodiments, the composition comprises one or more sugar alcohol particles comprising DC sugar alcohol particles in an amount of at least 30% by weight of the composition.

In some embodiments, the composition comprises one or more sugar alcohol particles comprising directly compressible (DC) and non-directly compressible (non-DC) sugar alcohol particles in a weight ratio between said non-DC sugar alcohol particles and said DC sugar alcohol particles of 0.2 and 1.2.

In some embodiments, the composition further comprises a disintegrant. In some embodiments, the composition further comprises a disintegrant in an amount of 1 to 10% by weight of the composition. In some embodiments, the composition further comprises a disintegrant of cross-linked polyvinylpyrrolidone.

In some embodiments, the composition further comprises one or more high-intensity sweeteners. In some embodiments, the composition further comprises fillers, such as calcium carbonate and/or talc and/or cellulose fibers and/or microcrystalline cellulose. In some embodiments, the composition further comprises an effervescence system.

In some embodiments, the composition is comprised in a tablet. In some embodiments, the composition is a tablet. In some embodiments, the composition is comprised in a tablet with a unit weight of 50 to 2000 mg. In some embodiments, the composition is comprised in a tablet with a unit weight of 50 to 200 mg. In some embodiments, the composition is comprised in a tablet with a unit weight of of 200 to 1500 mg.

In some embodiments, the composition is comprised in a tablet that disintegrates in at most 2 minutes in contact with saliva. In some embodiments, the composition is comprised in a tablet that disintegrates in at most 1 minute in contact with saliva. In some embodiments, the composition is comprised in a tablet that disintegrates in at most 30 seconds in contact with saliva.

In some embodiments, the composition is an orally disintegrating tablet. In some embodiments, the composition is a chewable tablet. In some embodiments, the composition is a lozenge. In some embodiments, the composition is comprised in a sachet. In some embodiments, the composition is comprised in a film strip. In some embodiments, the composition is comprised in a liquid formulation. In some embodiments, the composition is comprised in a mouth spray.

In some embodiments, the composition is comprised in a pouch. In some embodiments, nicotine is present in an amount of 5.0 to 20.0 mg, such as 5-15, such as 5-10 mg.

In some embodiments, wherein the composition comprises particles comprising gum base having an average particle size of at least 400 µm, such as between 400 µm and 1400 µm. In some embodiments, the composition comprises at least 20% by weight of gum base. In some embodiments, the composition comprises at least 5% by weight of natural resins. In some embodiments, the composition comprises at least 5% by weight of elastomer. In some embodiments, the composition comprises elastomers selected from styrene-butadiene rubber (SBR), butyl rubber, polyisobutylene (PIB), and combinations thereof. In some embodiments, the composition is a chewing gum. In some embodiments, the composition is a compressed chewing gum.

In some embodiments, the at least two antagonists are selected from the group consisting of Allicin, Borneol, Bornyl acetate, Carvacrol, Carveol, Capsaicin, Capsiate, Carlic, Cinnamaldehyde, Curcumin, Coolact P, Camphor, Cooling-agent 10, 1,4-Cineole, 1,8-Cineol, Camphorquinone, Dihydrocarveol, Etodolac, Eugenol, Evodiamine, Eucalyptol (1,8-Cineol), Frescolat ML, Frescolat MGA, (−)-Fenchone, Fenchyl alcohol, Gingerol, Geraniol, Hydroxy-citronellal, Icilin, Isofurane, (±)-Isobornyl methyl ether, (±)-Isoborneol, (−)-Limonene oxide, Linalool, Menthol, 2-Methylisoborneol, 3-Methylene-2-norbornanone, Norcamphor, Probenecid, α-Pinene oxide, PMD-38, Shogaols, α,β-Thujone, Thymol, WS-3, WS-23, Wintergreen, 8 borneol, isoborneol, bornyl acetate, isobornyl acetate, mono-bornyl succinate, mono-isobornyl succinate, mono-bornyl formate, and mono-isobornyl formate.

In some embodiments, the at least two antagonists are selected from the group consisting of Borneol, Carvacrol, Carveol, Eugenol, Menthol, Thymol, WS-3, WS-23 and Wintergreen.

In some embodiments, the composition is for use in smoking cessation therapy.

In a fourth aspect of the invention, the composition is for use in smoking cessation therapy.

In a fifth aspect of the invention, there is provided a method of alleviation of perceived nicotine irritation through inhibition or blocking of nicotine activated receptors or ion channels in the gastrointestinal tract, including the oral cavity, the method comprising administering an oral analgesic composition according to the invention.

DETAILED DESCRIPTION

Figure 1A:
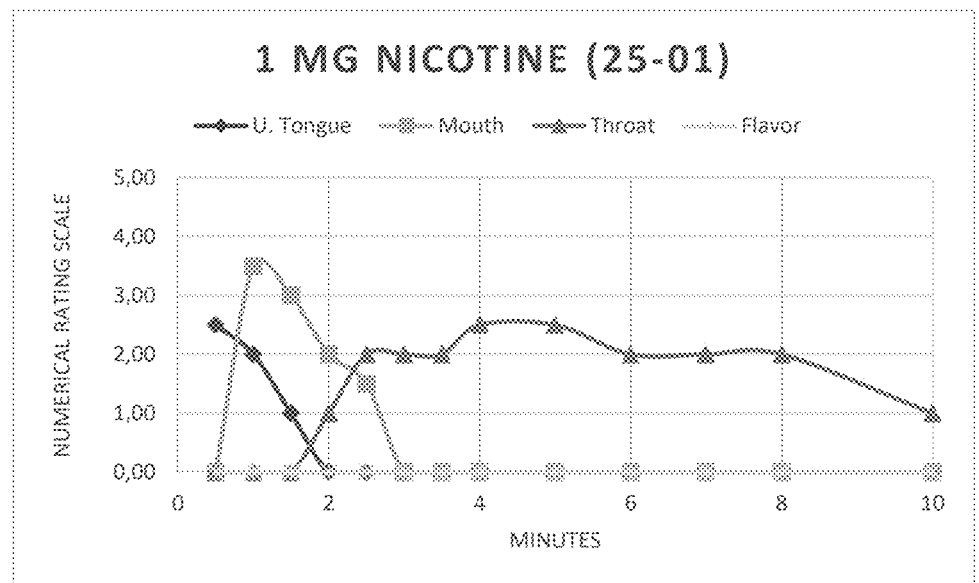
FIG. 1a shows a 1 mg nicotine fast disintegrating tablet (FDT) without antagonists.

Accordingly, the present invention provides an oral analgesic composition for alleviation of perceived nicotine irritation through inhibition or blocking of nicotine activated receptors or ion channels in the gastrointestinal tract, including the oral cavity. The composition may comprise one or more active pharmaceutical ingredients, such as one or more nicotine sources. The composition may also comprise one or more buffering agents, and the composition comprises at least two antagonists in an effective amount to inhibit or block nicotine agonist activation of Nicotinic Acetylcholine Receptors (nAChR) and/or Transient Receptor Potential (TRP) ion channels.

More specifically, the present invention provides at least two antagonists that may be selected from the group consisting of a first antagonist comprising camphor or one or more compounds resembling camphor, a second antagonist comprising eucalyptol, and a third antagonist comprising (1R,2S,5R)—N-(4-Methoxyphenyl)-5-methyl-2-(1-methylethyl)cyclohexanecarboxamide also known as WS-12.

Even more specifically, the present invention in some instances provides at least three antagonists in an effective amount to inhibit or block nicotine agonist activation of Nicotinic Acetylcholine Receptors (nAChR) and/or Transient Receptor Potential (TRP) ion channels.

As used herein, the term "oral analgesic composition", or just "oral composition", "oral preparation" or "oral formulation", or just "composition", "preparation" or "formulation", or "powder", is considered a composition for oral use. Typically, the oral composition is formed into fast disintegrating tablets. In other embodiments, the composition may be comprised in other dispensing forms, including pouches, sachets, film strips, chewing gums, chewable tablets, lozenges, or liquid formulations, such as liquid formulations in mouth sprays or vaporizers.

The term "weight of the oral composition" or "by weight of the oral composition" or similar wording meaning the same is defined in the present context as weight of the oral composition, not including the weight of optional outer coating, and the like.

As used herein, the term "%" and "percent" refers to percent by weight, unless otherwise is stated.

The verb "to comprise" as is used in this description and in the claims and its conjugations are used in its non-limiting sense to mean that items following the word are included, but items not specifically mentioned are not excluded. In addition, reference to an element by the indefinite article "a" or "an" does not exclude the possibility that more than one of the elements are present, unless the context clearly requires that there is one and only one of the elements. The indefinite article "a" or "an" thus usually means "at least one". Additionally, the words "a" and "an" when used in the present document in connection with the word comprising or containing denote "one or more." The expression "one or more" is intended to mean one, two, three or more.

As used herein, the term "orally disintegrating tablet" or "ODT" is intended to mean a tablet as understood by a skilled person within the art of ODT tablets, i.e. a solid dosage form that disintegrates rapidly (within seconds) without water when placed on the tongue.

As used herein, the term "fast disintegrating tablet", "fast dissolving tablet" or "FDT" is intended to mean a tablet as understood by a skilled person within the art of FDT tablets, i.e. a solid dosage form that disintegrates rapidly (within seconds) without water when placed on the tongue.

As used herein the term "pouch" is intended to mean a container typically formed by a web of a fibrous material enclosing a cavity. The pouch is designed for administration of an active ingredient in the oral cavity, and thus it is adapted for oral use, it is non-toxic and not water-soluble. The fibrous material may e.g. form a woven or non-woven web or fabric. The pouch may for example be sealed by bonding two corresponding pieces of web or fabric to each other along their edges to form a cavity for the oral composition. In order to release the active ingredients, the pouch is made water-permeable so as to allow saliva from the oral cavity to penetrate the pouch and enter the cavity, where the saliva can come into contact with the one or more active ingredients, whereby the one or more active ingredients are released from the oral pouch.

As used herein, the term "disintegrate" refers to a reduction of said object to components, fragments, or particles. Disintegration time is measured in vitro. The in vitro measurements are carried out in accordance with European Pharmacopeia 9.0, section 2.9.1, Disintegration of tablets and capsules.

As used herein, the term "dissolve" is the process where a solid substance enters a solvent (oral saliva) to yield a solution. Unless otherwise stated, dissolving implies a full dissolving of the compound in question.

As used herein, the terms "disintegrant" refers to an ingredient facilitating disintegration of an orally disintegrating tablet, when the orally disintegrating tablet comes into contact with saliva. Disintegrants usable within the scope of the invention may include starch, pregelatinated starch, modified starch (including potato starch, maize starch, starch 1500, sodium starch glycolate and starch derivatives), cellulose, microcrystalline cellulose, alginates, and superdisintegrants, such as crosslinked cellulose (such as sodium carboxy methyl cellulose), crosslinked polyvinyl pyrrolidone (PVP), crosslinked starch, crosslinked alginic acid, natural superdisintegrants, and calcium silicate. Disintegrants may often be considered as measure promoting the break-up of the dosage form into smaller fragments upon administration to allow the onset of drug dissolution and eventual absorption.

The term "non-DC sugar alcohol particles" refer to particles of non-directly compressible (non-DC) sugar alcohol. It is noted that the terms "non-DC sugar alcohol particles" and "non-DC particles" are used interchangeably. In the present context, the non-DC sugar alcohol particles refer to particles which have not been preprocessed by granulation with e.g. other sugar alcohols or binders for the purpose of obtaining so-called direct compressible particles (DC). In the present context, non-DC sugar alcohol particles include particles obtained by crystallization followed by milling which does not involve other sugar alcohols or binders. Thus, non-DC sugar alcohol particles are considered as particles consisting of non-DC sugar alcohol.

The term "DC sugar alcohol particles" refer to particles of direct compressible (DC) sugar alcohol. It is noted that the terms "DC sugar alcohol particles" and "DC particles" are used interchangeably. DC sugar alcohol particles may be obtained e.g. as particles of sugar alcohols having DC grade by nature, e.g. sorbitol, or by granulating non-DC sugar alcohol with e.g. other sugar alcohols or binders for the purpose of obtaining so-called direct compressible particles (DC). Also, granulation of non-DC sugar alcohol with water as binder is considered to result in "DC sugar alcohol particles" in the present context.

The term "sustained release" or "extended release" is herein intended to mean prolonged release over time. The term "rapid release" or "quick release" or "high release" is herein intended to mean a higher content released for a given period of time. The term "controlled release" is intended to mean a release of a substance from an oral composition by the aid of active use of the oral composition in the oral cavity of the subject, whereby the active use is controlling the amount of substance released.

As used herein, the term "pH regulating agent" refers to agents, which active adjust and regulates the pH value of the solution to which they have been added or are to be added. Thus, pH regulating agents may be acids and bases, including acidic buffering agents and alkaline buffering agents. On the other hand, pH regulating agents does not include substances and compositions that can only affect the pH by dilution. Furthermore, pH regulating agents does not include e.g. fillers, etc.

As used herein, the term "buffering agent" is used interchangeably with "buffer" and refers to agents for obtaining a buffer solution. Buffering agents include acidic buffering agents, i.e. for obtaining a buffer solution with an acidic pH, and alkaline buffering agents, i.e. for obtaining a buffer solution with an alkaline pH.

As used herein, the term "particle size" refers to the average particle size as determined according to European Pharmacopoeia 9.1 when using test method 2.9.38 particle size distribution estimation by analytical sieving, unless otherwise specifically is mentioned.

As used herein the term "nicotine source" refers to a substance that contains nicotine and has a physiological effect on the human body for the benefit of the human body or part thereof, such as tobacco, free nicotine base, nicotine ion-exchange resins, or the like.

As used herein the term "active pharmaceutical ingredients" or "active ingredient" refers to a substance that has a physiological effect on the human body for the benefit of the human body or part thereof and are capable of activation nicotine receptors or ion channels.

As used herein the term "nicotine receptors", "nicotine ion channels" or "nicotine channels" include but are not limited to Nicotinic Acetylcholine Receptors (nAChR), Transient Receptor Potential Vanilloid Type 1 (TRPV1) ion channels, Transient Receptor Potential Ankyrin 1 (TRPA1) ion channels, and Transient Receptor Potential Melastatin 8 (TRPM8) ion channels.

In the present context, the term antagonist is intended to mean compounds that interact with "nicotine receptors", "nicotine ion channels" or "nicotine channels" (activate/deactivate) and cause nicotine irritation reduction, contrary to taste masking flavors that work to overpower the nicotine irritation.

By the terms "water-insoluble gum base" or "gum base" or "gum base matrix" or similar wording is meant the mainly water-insoluble ingredients and hydrophobic gum base ingredients. The "gum base" may contain gum base polymers and plasticizers, waxes, emulsifiers, fats and/or fillers.

As used herein, the term "nicotine" refers to nicotine in any form, including free base nicotine, nicotine salts, nicotine bound to ion exchange resins, nicotine bound to zeolites; nicotine bound to cellulose, such as microcrystalline cellulose, such as of microbial origin, or starch microspheres, nicotine bound to CaCO3, and mixtures thereof. Thus, when referring to nicotine amounts, the amounts refers to the amount of pure nicotine. Thus, when measuring the concentration of nicotine added as nicotine salt, it is the mass of the equivalent amount of pure nicotine, not the mass of the salt, that is relevant.

As used herein, the term "nicotine salt" refers to nicotine in ionized form bonded electrostatically to a counterion.

In an embodiment of the invention, the nicotine salt is selected from nicotine ascorbate, nicotine aspartate, nicotine benzoate, nicotine monotartrate, nicotine bitartrate, nicotine chloride (e.g., nicotine hydrochloride and nicotine dihydrochloride), nicotine citrate, nicotine fumarate, nicotine gensitate, nicotine lactate, nicotine mucate, nicotine laurate, nicotine levulinate, nicotine malate nicotine perchlorate, nicotine pyruvate, nicotine salicylate, nicotine sorbate, nicotine succinate, nicotine zinc chloride, nicotine sulfate, nicotine tosylate and hydrates thereof (e.g., nicotine zinc chloride monohydrate).

In an embodiment of the invention, the nicotine salt comprises nicotine bitartrate. In the present context, nicotine bitartrate includes hydrates thereof. According to an embodiment of the invention, the nicotine salt is a water-soluble nicotine salt. In the present context, the term "water-soluble salt" is understood as a salt having a solubility in water of at least 10 g of salt per 100 mL water at standard lab conditions, including temperature of 25 degrees Celsius, atmospheric pressure, and pH of 7. Also, it should be understood that the when the nicotine comprises nicotine salt, possibly in combination with other forms of nicotine, the nicotine salt may consist of only one nicotine salt or may be a combination of two or more nicotine salts. In an embodiment of the invention, the nicotine is provided as free nicotine base.

As used herein, the term "release of nicotine" refers to the nicotine being made bioavailable, e.g. available for absorption over the mucous membrane in the oral cavity. While some forms of nicotine require dissolution for being bioavailable, other forms may be readily absorbed into the body without dissolution.

Nicotine (NCT) is the main alkaloid found in tobacco and responsible for an addictive potential. NCT can be found in both its free base form as a liquid, or as an ionic complex in the form of a salt with a counter ion e.g., chloride ion (Cl—) or sulphate ion (HSO4–).

In one embodiment, a buffer may be added to the oral composition to adjust the pH. Buffers may assist in facilitating nicotine absorption. The buffer can be selected from the group consisting of potassium carbonate, potassium bicarbonate, sodium carbonate and sodium bicarbonate, potassium citrate and dipotassium phosphate, or mixtures thereof.

In an embodiment of the invention, the composition further comprises a disintegrant.

In an embodiment of the invention, the disintegrant is selected from starch, pregelatinated starch, modified starch (including potato starch, maize starch, starch 1500, sodium starch glycolate and starch derivatives), cellulose, microcrystalline cellulose, alginates, and superdisintegrants, such as crosslinked cellulose (such as sodium carboxy methyl cellulose), crosslinked polyvinyl pyrrolidone (PVP), crosslinked starch, crosslinked alginic acid, natural superdisintegrants, and calcium silicate, and combinations thereof.

One advantage of the above embodiment may be that said disintegrant facilitates the disintegration and dissolution of the formulation, whereby a release of the nicotine and pH controlling agent is achieved.

Some embodiments of the present invention are directed to fast dissolving tablet formulations that can be formed by compression into fast dissolving tablets as an orally dispensable delivery vehicle. The fast dissolving tablet has at least one compound (or "component") which partially or fully melts or softens at or below body temperature and a water-soluble excipient. For example, use of the component which partially or fully melts below body temperature in an amount of about 0.01% to about 2.5% w in the fast dissolving tablet provides for a fast dissolving tablet composition that is conveniently amenable to established tablet manufacturing processes and equipment and to established packaging methods. The fast dissolving tablets of the invention may also include one or more colorants, sweeteners, souring agents, glidants or lubricants.

The hardness of the fast dissolving tablets is relatively low, such as less than or equal to about 2 kP. The fast dissolving tablets have an excellent mouthfeel resulting from the low melting point component which melts or softens in the mouth to produce a smooth feel and masks the grittiness of insoluble ingredients. The disintegration of the fast dissolving tablets of some embodiment may for example occur by a combination of melting, disintegration of the tablet matrix, and dissolution of water—soluble excipients. Even though the fast dissolving tablet contains a low melting point ingredient, it may be relatively stable to high temperatures. Heating the fast dissolving tablet above the melting point of its low melting point component will not significantly reduce its physical stability.

The friability of conventional tablets is measured by the percentage weight loss after a typical friability test (rotating 10 tablets in a friability apparatus for 100 rotations). This test is very harsh for some fast dissolving tablets and so cannot be used to measure their friability.

Fast dissolving tablets manufactured by the methods in the current invention may in some embodiments withstand 20-50 rotations in the friability apparatus before the fast dissolving tablet breaks. In some embodiments, after 20 rotations, the friability (% weight lost) is typically less than 1%.

The term "low melting point compound" may include any edible compound which melts or softens at or below 37 degrees Celsius which is suitable for inclusion in the fast dissolving tablets of the invention. Materials commonly used for manufacturing suppositories usually have a melting point at or just below body temperature and can be used in the fast dissolving tablets of the invention. The low melting point compound can be hydrophilic or hydrophobic.

Examples of hydrophilic low-melting point compounds include but are not limited to polyethylene glycol; the mean molecular weight range of polyethylene glycol for use in the fast dissolving tablets of the invention may for example be from about 900 to about 1000.

Examples of hydrophobic low-melting point compounds include, but are not limited to low melting point triglycerides, monoglycerides and diglycerides, semisynthetic glyceride (e.g., EUTECOL®, GELUCIRE® (Gattefosse)), hydrogenated oils, hydrogenated oil derivatives or partially hydrogenated oils (e.g. partially hydrogenated palm kernel oil and partially hydrogenated cottonseed oil), fatty acid esters such as myistyl lactate, stearic acid and palmitic acid esters, cocoa butter or its artificial substitutes, palm oil/palm oil butter, and waxes or mixtures of waxes, which melt at 37 degrees Celsius or below. In some embodiments, the hydrogenated oil is Wecobec M. To be effective in the fast dissolving tablet compositions, the low melting point compound must be edible.

Mono-, di- and triglycerides may in some embodiments be used as pure components. Hydrogenated vegetable oils and solid or semisolid fats are usually mixtures of mono-, di- and triglycerides. The melting point of the fat or hydrogenated vegetable oil is characteristic of the mixture and not due to a single component Witepsol (brand name by Condea), Supocire (brand name by Gattefosse), and Novata (brand name by Henkel) are commonly used in manufacturing suppositories, because they melt at body temperature. All are mixtures of triglycerides, monoglycerides and diglycerides.

The fast dissolving tablets of the present invention may also include a water-soluble excipient. As used herein, the term "water-soluble excipient" refers to a solid material or mixture of materials that is orally ingestible and readily dissolves in water. Examples of water-soluble excipients include but are not limited to saccharides, amino acids, and the like. Saccharides is one well-suited water-soluble excipient. For example, the saccharide is a mono-, di- or oligosaccharide. Examples of saccharides which may be added to the fast dissolving tablets of the invention may include, glucose, dextrose, fructose, maltose and xylose (all monosaccharides); sucrose, lactose, galatose (all disaccharides). In one embodiment, exemplified below, the saccharide is lactose. Other suitable saccharides are oligosaccharides.

Examples of oligosaccharides include dextrates and maltodextrins. Artificial sweeteners such as sucralose, acesulfame-potassium, saccharin or aspartame, for example, may also be used. Sugar alcohols such as sorbitol, erythritol, xylitol, lactitol, maltitol, mannitol, hydrogenated starch hydrolyzates, isomaltitol, for example, may also be used. Other water-soluble excipients may for example include amino acids such as alanine, arginine, aspartic acid, asparagine, cysteine, glutamic acid, glutamine, glycine, histidine, isoleucine, leucine, lysine, methionine, phenylalanine, proline, serine, threonine, tryptophan, tyrosine and valine. Glycine and lysine are examples of well-suited amino acids.

In some embodiments, the water-soluble excipient comprises from about 25 to about 97.5 percent by weight of a fast dissolving tablet composition. The range may for example be about 40 to about 80 percent by weight. For example, fast dissolving tablet compositions comprising about 25, 30, 35, 40, 45, 50, 55, 60, 65, 70, 75, 80, 85, 90, 95 or 97.5 percent by weight of the excipient, e.g. monosaccharide, disaccharide, polysaccharide, modified saccharide, artificial sweetener, sugar alcohol, or mixtures thereof are within the scope of the invention.

For purposes of the embodiments relating to fast dissolving tablets, "binder" refers to one or more ingredients added before or during granulation to form granules and/or promote cohesive compacts during compression. A "binder compound" or "binder constituent" is a compound or substance which is included in the binder. Binders of the present invention include, at least, the low melting point compound.

The fast dissolving tablet may also contain one or more glidant materials which may improve the flow of the powder blend and minimize fast dissolving tablet weight variation. Glidants such as silicone dioxide may be used in the fast dissolving tablets of the present invention.

Additionally, the fast dissolving tablets of the invention may include lubricants (e.g. magnesium stearate or sodium stearyl fumarate) to facilitate ejection of the finished fast dissolving tablet from dies after compression and to prevent fast dissolving tablets from sticking to punch faces and each other.

In some embodiments, the method of forming the fast dissolving tablet compositions includes preparing a fast dissolving granulation by mixing a low-melting point compound, (for example a hydrogenated oil, partially hydrogenated oil or hydrogenated oil derivative) and a water-soluble excipient, (for example a saccharide or modified saccharide). The term "fast dissolving granulation" refers to a composition of the low melting point compound and the water-soluble excipient prepared for use as a granulation in the manufacture of fast dissolving tablets of the invention. A portion of the fast dissolving granulation may then be added to the remaining ingredients. However, methods of forming the fast dissolving tablets of the invention wherein all fast dissolving tablet constituents are combined simultaneously or wherein any combination of fast dissolving tablet constituents are combined separate from the other constituents are within the scope of the invention.

Granulation end point can be determined visually (visual inspection) or by using a load cell that measures power consumption. Tablet manufacturing and granulation routinely employ both techniques.

The fast dissolving tablet compositions of the invention can be formed by melt granulation which is a suitable method. In particular, the melt granulation can be prepared in a high shear mixer (e.g. high sheer granulation process), low sheer mixer or fluid bed granulator. An example of high shear mixer is Diosna (this is a brand name by Diosna Dierks & Sohne GmbH). Examples of low shear mixers are various tumbling mixers (e.g. twin shell blenders or V-blender). Examples of fluid bed granulators are Glatt and Aeromatic fluid bed granulators.

Examples of manufacturing the granulation include but are not limited to: Melting the low melting point ingredient, then combining (e.g. by spraying) it with the water-soluble ingredient(s) (including the water-soluble excipient) in the granulator and mixing until granules form. Loading the water-soluble excipient in the granulator and spraying the molten low melting point compound on it while mixing. Combining the two (water-soluble component (including the water-soluble excipient) and low melting point component) and possibly other ingredients and mixing while heating to a temperature around a higher than the melting point of the low melting point component until the granules form. After the granulation congeals, it may be milled and/or screened. Examples of mills that can be used are Co Mill. Stokes Oscillator (these are brand names). Any mills that are commonly used for milling tablet granulations may be used.

Melt extrusion can be used to form the fast dissolving granulation. An example of an extruder that can be used is Nica (a brand name by Niro-Aeromatic). The low melting point compound and the water-soluble saccharide (or other excipient) are mixed and heated in a planetary mixer bowl (low shear mixer) that is usually part of the extruder. The soft mass is then fed to the extrusion chamber and forced through small holes or orifices to shape it into thin rods or cylinders. After the extruded material congeals it can be milled or spheronized using standard equipment. In the spheronization step, the extrudate is dumped onto the spinning plate of the spheronizer and broken up into small cylinders with a length equal to their diameter, then rounded by frictional forces (See, International Journal of Pharmaceutics 1995, 116:131-146, especially p. 136).

Spray congealing or prilling can also be used to form the fast dissolving tablet compositions of the invention. Spray congealing includes atomizing molten droplets of compositions which, may include low melting point compound, low melting point compound and selected fast dissolving tablet ingredients, or the entire fast dissolving tablet composition onto a surface. The surface may be an inert mechanical support, a carrier surface or in embodiments in which the spray contain droplets only part of the fast dissolving tablet components a second portion of the fast dissolving tablet composition. Equipment that can be used for spray congealing includes spray driers (e.g., Nero spray drier) and a fluid bed coater/granulation with top spray (e.g., Glatt fluid bed coater/granulator). In some embodiments, a fast-dissolve granulation is formed wherein e.g. a water-soluble excipient, such as a saccharide, is suspended in a molten low melting point ingredient and spray congealed. After spray congealing, the resulting composition is allowed to cool and congeal. Following congealing of the mixture, it is screened or sieved and mixed with remaining fast dissolving tablet constituents. Spray congealing processes wherein fast-dissolve granulations comprising any combination of low melting point compound and other fast dissolving tablet constituents are melted and spray congealed onto other fast dissolving tablet constituents are within the scope of the present invention. Spray congealing processes wherein all fast dissolving tablet constituents, including the low-melting point compound, are mixed, the low melting point compound is melted and the mixture is spray congealed onto a surface are also within the scope of the invention.

After spray congealing, the mixture may be milled and then combined with other fast dissolving tablet constituents.

Following formation of the final fast dissolving tablet composition, the composition may be further processed to form a fast dissolving tablet shape.

Mixing and milling of fast dissolving tablet constituents during the preparation of a fast dissolving tablet composition may be accomplished by any method which causes the composition to become mixed to be essentially homogeneous. In some embodiments the mixers are high shear mixers such as the Diosna, CoMill or V-B lender.

Some embodiments of the present invention are directed to a lozenge. The lozenges comprise the oral composition of the invention together with further ingredients. In some embodiments, such further ingredients may include a combination of water-soluble synthetic or semi-synthetic non-ionic polymers having varied viscosities. As used herein, water-soluble synthetic or semisynthetic non-ionic polymers may include, but are not limited to alkylcelluloses, hydroxyalkylcelluloses, hydroxyalkyl alkylcelluloses, polyalkylene oxides, carboxyalkylcellulose esters methacrylate copolymers; polyvinylalcohol; polyvinylpyrrolidone, copolymers of polyvinylpyrrolidone with vinyl acetate; combinations of polyvinylalcohol and polyvinylpyrrolidone and copolymers of ethylene oxide and propylene oxide. Examples of alkylcelluloses may include methylcellulose. Examples of hydroxyalkylcelluloses may include hydroxymethylcellulose, hydroxyethylcellulose, hydroxypropylcellulose and hydroxybutylcellulose. Examples of hydroxyalkyl alkylcelluloses may include hydroxyethyl methylcellulose and hydroxypropyl methylcellulose. Examples of polyalkylene oxides may include polyethylene oxide and polypropylene oxide. Water-soluble synthetic or semisynthetic non-ionic polymers may also include dextrin, semisynthetic starch, polyhydroxyethylmethacrylate (PHEMA), water-soluble nonionic polymethacrylates and their copolymers, modified cellulose, modified polysaccharides, nonionic semisynthetic gums, nonionic polysaccharides and/or mixtures thereof.

In certain embodiments, the polymer is a cellulose ether derivative such as hydroxypropyl methylcellulose and hydroxypropyl cellulose (HPC). In another embodiment, the polymer is hydroxypropyl methylcellulose. In yet another embodiment, the polymer is hydroxypropylmethyl cellulose (HPMC).

Lozenges of the present invention may for example contain a polymer having a high viscosity and a polymer having a low viscosity. In certain embodiments, the polymer having the high viscosity has a viscosity of from about 2,000 cps to about 6,000 cps, or from about 3,000 cps to about 5,000 cps, or from about 3,500 cps to about 5,500 cps. In one embodiment, the high viscosity polymer has a viscosity of about 4,000 cps. Viscosity for the high viscosity polymers was determined using a Brookfield type LV Model, or equivalent.

In certain embodiments, the polymer having the low viscosity has a viscosity of from about 50 cps to about 150 cps, or from about 80 cps to about 100 cps, or from about 90 cps to about 110 cps. In one embodiment, the low viscosity polymer has a viscosity of about 100 cps. Viscosity for the low viscosity polymers was determined using Capillary Viscometer Methods 911.

The amount of high viscosity polymer may be from between about 1% to about 20% by weight, or from between about 2% to about 10% by weight, or from about 3% to about 7% by weight. The amount of low viscosity polymer may be from between about 1% to about 20% by weight, or from between about 2% to about 10% by weight, or from about 3% to about 7% by weight.

The ratio of high viscosity polymer to low viscosity polymer in the lozenge may vary depending upon the desired dissolution characteristics of the lozenge. For example, if a slowly dissolving lozenge is desired, a higher ratio of high viscosity polymer to low viscosity polymer may be desired. If, however, a quickly dissolving lozenge is desired, a lower ratio of high viscosity polymer to low viscosity polymer may be desired. In certain embodiments, the ratio of high viscosity polymer to low viscosity polymer may be between about 1:50 and about 50:1, or between about 1:30 and about 30:1, or between about 1:20 and about 20:1, or between about 1:10 and about 10:1, or between about 1:2 and about 2:1.

In some embodiments optimization of the ratio of high viscosity polymer to low viscosity polymer may result in a lozenge with improved dissolution characteristics. For example, too much high viscosity polymer may result in lozenges having highly varied dissolution profiles on a lozenge to lozenge basis. In addition, the amount of high viscosity polymer may not be consistent on an intra-lozenge basis—i.e., the high viscosity polymer may not be evenly distributed throughout the lozenge. If only low viscosity polymers are used in a lozenge, the active ingredient(s) may be released from the lozenge too quickly. To obtain an appropriate release using only low viscosity polymer, a large amount of polymer may be required, resulting in a larger lozenge tablet, which may be regarded as having undesirable textural properties, e.g. that the lozenge tablet may have a slimy mouth feel.

According to some embodiments of the invention, a combination of high viscosity polymer and low viscosity polymer are used in the lozenge. In some embodiments, this may result in lozenge to lozenge dissolution variation being well controlled.

Lozenges of the present invention may in some embodiments also include at least one diluent, at least one excipient selected from the group consisting of taste masking agents, antioxidants, glidants, and colorants, or any combination thereof.

Suitable diluents for lozenges of the invention or embodiments thereof may include, for example, maltitol, maltose, fructose, glucose, trehalose, sorbitol, sucrose, sugar, mannitol, xylitol, isomalt, dextrose, maltodextrin, dextrates, dextrin, erythritol, lactitol, polydextrose and mixtures thereof. In one embodiment, the diluent is mannitol. In one embodiment, the diluent is present from about 500 mg to about 1100 mg per lozenge, in another embodiment from about 750 mg to about 1000 mg per lozenge.

Lozenges of the present invention or embodiments thereof may have a total weight per lozenge of between about 100 mg and about 2000 mg, or between about 500 mg and about 1500 mg. or between about 1000 mg and about 1300 mg. In one embodiment the total weight per lozenge is about 1200 mg.

Lozenges of the present invention or embodiments thereof may be compressed by traditional tableting compression techniques. In certain embodiments, the lozenges may be compressed to a hardness of from about 20 N to about 200 N, or from about 30 N to about 150 N, or from about 50 N to about 100 N.

Certain embodiments of the present invention are directed to lozenges comprising an intragranular component and an extragranular component. The use of intragranular components for formulations is common in solid dosage forms such as tablets and compressed lozenges. Typically, the intragranular component (or "master granules") is made to improve the processability of a solid dosage form and to reducing friability during transportation and handling. In the absence of an intragranular component. tablets or lozenges where high levels of non-direct compressible diluents are used can be difficult to process or result in a product with high friability. Active ingredient(s), and other optional excipients, may for example be blended with the intragranular component, prior to compressing, and make up the "extragranular" component of these traditional lozenge formulations. Alternatively, the active ingredient(s) may be included in the intragranular components.

Intragranular components may in some embodiments be formed by suitable means such as, for example, slugging, aqueous or non-aqueous wet granulation, fluidized bed granulation, spray drying or roller compaction. In one embodiment, the granulate is formed by a wet granulation process, wherein the intragranular ingredients are mixed in a suitable granulator to form a powder blend. Water or a suitable solvent or solvent mixture may be added and mixed thoroughly with the powder blend. This process may allow the powder blend to become wet and to agglomerate to form granules. The wet granulate may then be dried, e.g. in a conventional tray drier, and then generally milled and screened to obtain granules with a desired particle size distribution. In another example embodiment, the granulate is formed by a fluidized bed granulation process in which the intragranular ingredients are fluidized in a fluid bed drier and then sprayed with water or suitable solvent. The wet granules so formed are dried and are then generally milled and screened to obtain granules with a desired particle size distribution. In another example embodiment spray granulation is used as a method to granulate powders to obtain spherical free flowing granules. In a spray granulation operation, the desired intragranular ingredients may be suspended in water or suitable solvent. This suspension is sprayed using an atomizer into a spray drier. The droplets so generated by the atomizer may then be dried to form granules, which are then generally milled and screened to obtain granules with a desired particle size distribution. In yet another example embodiment, roller compaction may be used as a method for manufacture of the granulate, where a dry blend of the other desired intra granular ingredients are forced through a pair of rollers held under high pressure, thereby compacting the powder compacts to form wafer like sheets, which may then be generally milled and screened to obtain granules with a desired particle size distribution. Small amounts of water can be sprayed on to the powder blend prior to feeding into the rollers to enhance the binding properties of the ingredients in this process. The granules so obtained by any of the granulation processes described can be further processed to obtain tablets or lozenges.

Presence of polymer in the intra granular component and extragranular component may serve two separate functions. Polymer in the intragranular component may serve as a binder to form the master granules. The intragranular component may in some embodiments include a high viscosity water-soluble synthetic or semi-synthetic non-ionic polymer, a low viscosity water-soluble synthetic or semi-synthetic non-ionic polymer, or both. In one embodiment, the intragranular component contains both a high viscosity water-soluble synthetic or semisynthetic non-ionic polymer and a low viscosity water-soluble synthetic or semi-synthetic non-ionic polymer. The amount of high viscosity water-soluble synthetic or semi-synthetic non-ionic polymer may be from between about 1% and about 20% by weight, or from between about 2% and about 10% by weight, or from about 3% and about 7% by weight. The amount of low viscosity water-soluble synthetic or semisynthetic non-ionic polymer may in some embodiments be from between about 1% to about 20% by weight, or from between about 2% to about 10% by weight, or from about 3% to about 7% by weight. In one embodiment, the intragranular component comprises about 5% high viscosity water-soluble synthetic or semi-synthetic non-ionic polymer and about 5% low viscosity water-soluble synthetic or semi-synthetic non-ionic polymer.

In some embodiments, the ratio of high viscosity water-soluble synthetic or semi-synthetic non-ionic polymer to low viscosity water-soluble synthetic or semi-synthetic non-ionic polymers in the intragranular component may be between about 1:50 and about 50:1, or between about 1:30 and about 30:1, or between about 1:20 and about 20:1, or between about 1:10 and about 10:1, or between about 1:2 and about 2:1.

Presence of polymer in the extragranular component may in some embodiments act as a dissolution modifier. Various dissolution profiles can be achieved by varying the amount and ratios of high viscosity polymer and low viscosity polymers. The extragranular component may in some embodiments include a high viscosity water-soluble synthetic or semi-synthetic non-ionic polymer, a low viscosity water-soluble synthetic or semi-synthetic non-ionic polymer, or both. In one embodiment, the extra granular component includes a low viscosity water-soluble synthetic or semi-synthetic non-ionic polymer.

The amount of high viscosity water-soluble synthetic or semi-synthetic non-ionic polymer may in some embodiments be between about 1% and about 20% by weight, or between about 2% and about 10% by weight, or between about 3% and about 7% by weight. The amount of low viscosity water-soluble synthetic or semi-synthetic non-ionic polymer may in some embodiments be between about 1% and about 20% by weight, or between about 2% and about 10% by weight, or between about 3% and about 7% by weight.

In one embodiment, the extragranular component contains about 2% low viscosity water-soluble synthetic or semi-synthetic non-ionic polymer, or about 5% low viscosity water-soluble synthetic or semi-synthetic non-ionic polymer, or about 18% low viscosity water-soluble synthetic or semisynthetic non-ionic polymer.

The ratio of high viscosity water-soluble synthetic or semi-synthetic non-ionic polymer to low viscosity water-soluble synthetic or semi-synthetic non-ionic polymer in the intra granular component may in some embodiments be between about 1:50 and about 50:1, or between about 1:30 and about 30:1, or between about 1:20 and about 20:1, or between about 1:10 and about 10:1, or between about 1:2 and about 2:1.

Active ingredient(s) may according to various embodiments be present in the intragranular component, the extragranular component or both. In one embodiment, active ingredient(s) is/are present in the extragranular component. A pH controlling acid may also be present in the intragranular component, the extragranular component or both. In one embodiment, a pH controlling acid is present in the extragranular component. In another embodiment, a pH controlling acid is present in the intra granular component and the extra granular component.

Lozenges of the present invention may have an in vitro dissolution profile (as determined by USP Type II apparatus, rotating paddle, with 900 ml of Phosphate buffer at pH 7.4, 37° C. set at rotating speed of 75 rpm) of: 25 to 50% at 1 hour; 50 to 99% at 3 hours; 75 to 100% at 6 hours.

In other embodiments, lozenges of the present invention may have an in vitro dissolution profile (as determined by USP Type II apparatus, rotating paddle, with 900 ml of Phosphate buffer at pH 7.4, 37° C. set at rotating speed of 75 rpm) of: 30 to 40% at 1 hour; 50 to 70% at 3 hours; 90 to 100% at 6 hours.

In yet other embodiments, lozenges of the present invention may have an in vitro dissolution profile (as determined by USP Type I apparatus, basket, Phosphate buffer at pH 7.4, 37° C. set at rotating speed of 100 rpm) of: 33 to 37% at 1 hour; 65 to 70% at 3 hours; 97 to 100% at 6 hours.

In certain embodiments, lozenges of the present invention may have the following dissolution profile in the oral cavity: 45 to 60% at 15 minutes; 70 to 85% at 30 minutes; 90 to 100% at 60 minutes.

In another embodiment, lozenges of the present invention may have the following dissolution profile in the oral cavity: 50 to 55% at 15 minutes; 75 to 80% at 30 minutes; 95 to 100% at 60 minutes.

In one embodiment, 100% of a lozenge of the present invention is dissolved in the oral cavity in less than about 60 minutes, or in less than about 50 minutes, or in less than about 45 minutes.

In another embodiment, at least about 50% of the lozenge is dissolved in the oral cavity in less than about 30 minutes or in less than about 15 minutes.

Some embodiments of the present invention are directed to chewing gums, such as compressed chewing gums, as an orally dispensable delivery vehicle. The chewing gums in these embodiments comprise the oral composition of the invention.

By the phrase "compressed chewing gum" is meant a chewing gum comprising granules or powder being exposed to a punching means in a tableting machine, pressing the granules or powder to a coherent mass of compressed material.

In some embodiments of the present invention, the gum base comprises for example
elastomer in the range of 5-40% by weight of the gum base,
natural resin in the range of 8-45% by weight of the gum base, and
synthetic resin in the range of 5-95% by weight of the gum base.

In some embodiments of the present invention, the chewing gum tablet comprises natural resins in an amount of 0.1 to 40%, such as 1 to 30%, such as 3 to 25% or 5 to 20%, by weight of the chewing gum tablet.

In embodiments of the present invention, the chewing gum tablet comprises synthetic resins in an amount of 0.1 to 40%, such as 1 to 30%, such as 3 to 25% or 5 to 20%, by weight of the chewing gum tablet.

In embodiments of the present invention, the chewing gum tablet comprises elastomer in an amount of at least 2% by weight of the chewing gum formulation, such as at least 4% by weight of the chewing gum tablet. In embodiments of the present invention, the chewing gum tablet comprises elastomer in an amount of less than 35% by weight of the chewing gum formulation, such as less than about 25% by weight of the chewing gum formulation such as less than 20%, 15% or 10% by weight of the chewing gum tablet.

In embodiments of the present invention, the chewing gum tablet comprises humectants, such as propylene glycol or glycerol.

In embodiments of the present invention, the chewing gum tablet is provided with a coating.

In embodiments of the present invention, the chewing gum tablet has a weight in the range of 0.1 to 10 grams, such as in the range of 0.5 to 4 grams.

According to an embodiment of the invention, the chewing gum tablet may comprise filler. In embodiments of the present invention, the chewing gum tablet comprises filler in an amount of 0.1 to 50% by weight of the chewing gum. In embodiments of the present invention, the chewing gum tablet comprises filler in an amount of 0.1 to 50% by weight of the chewing gum tablet, wherein the filler is hydrophobic and wherein at least 90% of the filler is contained in the chewing gum tablet throughout the chewing of a user during a chewing period of at least 10 minutes.

Elastomers provide the rubbery, cohesive nature to the gum, which varies depending on this ingredient's chemical structure and how it may be compounded with other ingredients. Elastomers suitable for use in the gum base and gum of the present invention may include natural or synthetic types. Elastomer plasticizers vary the firmness of the gum base. Their specificity on elastomer inter-molecular chain breaking (plasticizing) along with their varying softening points cause varying degrees of finished gum firmness and compatibility when used in base. This may be important when one wants to provide more elastomeric chain exposure to the alkane chains of the waxes.

The elastomers (rubbers) employed in the gum base may vary depending upon various factors such as the type of gum base desired, the texture of gum formulation desired and the other components used in the formulation to make the final chewing gum product. The elastomer may be any water-insoluble polymer known in the art and includes those gum polymers utilized for chewing gums and bubble gums. Illustrative examples of suitable polymers in gum bases include both natural and synthetic elastomers. For example, those polymers which are suitable in gum base formulations include, without limitation, natural substances (of vegetable origin) such as chicle gum, natural rubber, crown gum, nispero, rosidinha, jelutong, perillo, niger gutta, tunu, balata, guttapercha, lechi capsi, sorva, gutta kay, and the like, and mixtures thereof. Examples of synthetic elastomers include, without limitation, styrene-butadiene copolymers (SBR), polyisobutylene, isobutylene-isoprene copolymers, polyethylene, polyvinyl acetate and the like, and mixtures thereof.

Natural resins may be used according to the invention and may be natural rosin esters, often referred to as ester gums including as examples glycerol esters of partially hydrogenated rosins, glycerol esters of polymerised rosins, glycerol esters of partially dimerized rosins, glycerol esters of tally oil rosins, pentaerythritol esters of partially hydrogenated rosins, methyl esters of rosins, partially hydrogenated methyl esters of rosins, pentaerythritol esters of rosins, synthetic resins such as terpene resins derived from alpha-pinene, beta-pinene, and/or d-limonene, and natural terpene resins.

In an embodiment of the invention, the resin comprises terpene resins, e.g. derived from alpha-pinene, beta-pinene, and/or d-limonene, natural terpene resins, glycerol esters of gum rosins, tall oil rosins, wood rosins or other derivatives thereof such as glycerol esters of partially hydrogenated rosins, glycerol esters of polymerized rosins, glycerol esters of partially dimerised rosins, pentaerythritol esters of partially hydrogenated rosins, methyl esters of rosins, partially hydrogenated methyl esters of rosins or pentaerythritol esters of rosins and combinations thereof.

In an embodiment of the invention, the powdered chewing gum tablet base material comprises sweeteners, such as bulk sweeteners, sugar sweeteners, sugar substitute sweeteners, artificial sweeteners, high-intensity sweeteners, or any combination thereof.

Suitable bulk sweeteners include both sugar and non-sugar sweetening components. Bulk sweeteners typically constitute from about 5 to about 95% by weight of the chewing gum tablet, more typically about 20 to about 80% by weight such as 30 to 70% or 30 to 60% by weight of the chewing gum tablet.

Useful sugar sweeteners are saccharide-containing components commonly known in the tablet and chewing gum tablet art including, but not limited to, sucrose, dextrose, maltose, dextrins, trehalose, D-tagatose, dried invert sugar, fructose, levulose, galactose, corn syrup solids, and the like, alone or in combination.

As an example, sorbitol can be used as a non-sugar sweetener. Other useful non-sugar sweeteners include, but are not limited to, other sugar alcohols such as mannitol, xylitol, hydrogenated starch hydrolysates, maltitol, isomalt, erythritol, lactitol and the like, alone or in combination.

High intensity artificial sweetening agents can also be used alone or in combination with the above sweeteners. For example, high intensity sweeteners include, but are not limited to sucralose, aspartame, salts of acesulfame, alitame, saccharin and its salts, cyclamic acid and its salts, glycyrrhizin, dihydrochalcones, thaumatin, monellin, stevioside (natural intensity sweetener) and the like, alone or in combination. In order to provide longer lasting sweetness, it may be desirable to encapsulate or otherwise control the release of at least a portion of the artificial sweeteners. Techniques such as wet granulation, wax granulation, spray drying, spray chilling, fluid bed coating, conservation, encapsulation in yeast cells and fiber extrusion may be used to achieve desired release characteristics. Encapsulation of sweetening agents can also be provided using another chewing gum tablet component such as a resinous compound.

Usage level of the artificial sweetener will vary considerably and will depend on factors such as potency of the sweetener, rate of release, desired sweetness of the product and cost considerations. Thus, the active level of artificial sweetener may vary from about 0.001 to about 8% by weight (such as from about 0.02 to about 8% by weight). When carriers used for encapsulation are included, the usage level of the encapsulated sweetener will be proportionately higher. Combinations of sugar and/or non-sugar sweeteners may be used in the chewing gum formulation.

A chewing gum tablet according to the invention may, if desired, include one or more fillers/texturisers including as examples, magnesium and calcium carbonate, sodium sulphate, ground limestone, silicate compounds such as magnesium and aluminum silicate, kaolin and clay, aluminum oxide, silicium oxide, talc, titanium oxide, mono-, di- and tri-calcium phosphates, cellulose polymers, such as wood, and combinations thereof.

A number of chewing gum tablet base materials well known within the art may be applied within the scope of the present invention. Such components comprise but are not limited to waxes, fats, softeners, fillers, antioxidants, emulsifiers, colouring agents, binding agents and acidulants The gum base granules according to the invention may for example be made by means of extrusion and under-water pelletizing.

The size of gum base granules according to the present invention are controlled by several factors such as opening sizes, the gum composition, gum temperature and pressure drop, if a die plate is used in the extruder. Due to an interaction between the pressurized gum composition, temperature and friction in the openings of the die device, the average diameter of the produced granules are normally larger than the diameters of the openings in the die device. The relation between the diameters of the openings in the die device and the average diameters of granules produced from a specific gum composition may be determined by the skilled person on basis of routine experiments.

According to the invention it is also possible to produce granules with different average diameters by making granules with one diameter, and subsequently mix the granules with different average diameters in desired proportions.

Although the openings of the die device may have cross-sections of any desired shape, e.g. circular, oval, square etc., it is in some embodiments preferred that the die device comprises openings with substantially circular cross-section and diameters in the range of 0.1 to 1.3 mm. A first set of openings can e.g. have a first diameter in the range of 0.07 to 0.7 mm, such as in the range of 0.15 to 0.6 mm, and suitably in the range of 0.2 to 0.5 mm. A second set of openings can have a second diameter larger than said first diameter. The second diameter is conveniently in the range of 0.4 to 1.3 mm, such as in the range of 0.7 to 1.2 mm.

In some embodiments the chewing gum granulating system further comprises a drying device. Powder sweetener or talk may be added to the granules in a final drying step. The drying device can be a conventional centrifugal dryer or another suitable dryer e.g. a fluid bed dryer. The drying device can, for example, include a mixer. The powder sweetener may in an embodiment be sorbitol, which is mixed to the dried or partially dried granules. Minor amounts of residual moisture on the surface of the granules, e.g. 2% Wt. based on the total weight of the granules, may contribute to the adherence of the sorbitol powder to the surface of the granules. It is possible to use a conventional anti-agglomerating agent as e.g. talcum, but sorbitol powder can function as an anti-agglomerating agent, and at the same time serves as sweetener. Although sorbitol is found to be most suitable, other bulk sweeteners based on polyols may also be suitable, e.g. mannitol, xylitol, maltitol, isomaltol, erythriol, and lactitol.

In one embodiment the chewing gum granulating system according to the invention further comprises one or more sieves adapted for removing granules with an average diameter such as above 1.3 mm. The removal of larger granules improves a subsequent tabletting process.

According to an embodiment of the invention at least the extruder and/or the die device comprises means for controlling the temperature of the chewing gum composition. The means for controlling temperature can be cooling or heating devices and may serve to facilitate the flow of gum composition through the extruder and the die device. In an embodiment the extruder comprises delivering means for delivering sweetener and/or flavour to the gum composition in the extruder.

During extrusion of the gum composition the differential pressure between the gum composition in the extruder and the gum composition in the liquid filled chamber, i.e. over the die device is suitably above 10 bar, such as above 18 bar, such as in the range of 25 to 90 bar. The temperature of the gum composition in the extruder may for example be in the range of 40 to 125° C., suitably in the range 50 to 115° C. The temperature of the die device may for example be in the range of 60 to 250° C., suitably in the range 80 to 180° C. The temperature of the liquid in the liquid filled chamber is conveniently in the range of 8 to 40° C. The optimum for the pressures and temperatures in the method according to the invention may, however, may be determined by the skilled person as a matter of routine. The optimum values for specific gum compositions, varies of course, depending on the composition.

The quick cooling in the air filled or water-filled chamber may act to preserve possible fragile ingredients in the gum composition so that their qualities are better kept intact and conveyed into the granules included in the final gum product. This improved quality of the gum composition in the granules improves the general composition of the chewing gum product.

Granule fractions of different average weights may be produced with two different setups, each producing a batch of granules of a particular average weight, followed by a blending of the fractions. It is also possible to design a die means with die openings of at least two different sizes to simultaneously obtain granules with different average diameter. Thus, it is possible to obtain granules having different weights. More than two different average weights may be obtained, depending on the design of the die means in use. It is for instance possible to obtain granules with three, four or more different average weights.

The granules may be cut in a very large liquid-filled chamber, in which the granules are also cooled. In some embodiments the cooling is combined with transfer of the granules away from the chamber. This can be done e.g. by cooling the cut granules in water during transfer from the liquid filled chamber to a de-watering device. The transfer time from cutting to de-watering can be less than 6 s. The advantage of this is that water-soluble ingredients in the gum composition are not unnecessarily washed out of the granules. Optionally, the total time of contact between granules and cooling water can be further limited to less than 4 s.

In some embodiments the chewing gum composition fed to the extruder is a gum base, and that it at least includes one or more flavouring agents when extruded through the die means. The flavours within the granules cause a prolonged release of taste during mastication.

The powdered chewing gum tablet base material according to the invention may for example comprise so-called primary particles or aggregated primary particles, also referred to as granules. When these are compressed, bonds are established between the particles or granules, thereby conferring a certain mechanical strength to the compressed chewing gum tablet.

It should be noted that the above-introduced terms: powder, primary particles and granules may be somewhat misleading in the sense that the difference between primary particles and granules may very often be looked upon differently depending on the background of the user. Some may for instance regard a sweetener, such as sorbitol, as a primary particle in spite of the fact that sorbitol due to the typically preprocessing performed on sorbitol when delivered to the customer should rather be regarded as some sort of granule. The definition adopted in the description of this invention is that granules refer to macro-particles comprising more or less preprocessed primary particles.

When pressure is applied to the powder raw material, the bulk volume is reduced and the amount of air is decreased. During this process energy is consumed. As the particles come into closer proximity to each other during the volume reduction process, bonds may be established between the particles or granules. The formation of bonds is associated with a reduction in the energy of the system as energy is released.

Volume reduction takes place by various mechanisms and different types of bonds may be established between the particles or granules depending on the pressure applied and the properties of the particles or granules.

The composition of chewing gum base formulations, which are admixed with chewing gum ingredients as defined below, can vary substantially depending on the particular product to be prepared and on the desired masticatory and other sensory characteristics of the final product. However, typical ranges (weight %) of the above gum base components are: 5 to 50% by weight elastomeric compounds, 5 to 55% by weight elastomer plasticizers, 0 to 50% by weight filler/texturiser, 5 to 35% by weight softener and 0 to 1% by weight of miscellaneous ingredients such as antioxidants, colorants, etc.

Suitable bulk sweeteners include e.g. both sugar and non-sugar components. Bulk sweeteners typically constitute from about 5 to 95% by weight of the chewing gum tablet, more typically about 20 to 80% by weight such as 30 to 60% by weight of the chewing gum tablet. Useful sugar sweeteners are saccharide-containing components commonly known in the tablet and chewing gum tablet art including, but not limited to, sucrose, dextrose, maltose, dextrins, trehalose, D-tagatose, dried invert sugar, fructose, levulose, galactose, corn syrup solids, and the like, alone or in combination.

If a low-calorie gum is desired, a low-calorie bulking agent can be used. Examples of low-calorie bulking agents include polydextrose, Raftilose, Raftilin, Inuline, fructooligosaccharides (NutraFlora®, palatinose oligosaccharided; guar gum hydrolysates (e.g. Sun Fiber®) or indigestible dextrins (e.g. Fibersol®). However, other low calorie-bulking agents can be used.

Further chewing gum tablet base material ingredients, which may be included in the chewing gum tablet mixture processed in the present process, include surfactants and/or solubilisers. As examples of types of surfactants to be used as solubilisers in a chewing gum composition, according to the invention reference is made to H. P. Fiedler, Lexikon der Hilfstoffe für Pharmacie, Kosmetik and Angrenzende Gebiete, pages 63-64 (1981) and the lists of approved food emulsifiers of the individual countries. Anionic, cationic, amphoteric or non-ionic solubilisers can be used. Suitable solubilisers include lecithins, polyoxyethylene stearate, polyoxyethylene sorbitan fatty acid esters, fatty acid salts, mono and diacetyl tartaric acid esters of mono and diglycerides of edible fatty acids, citric acid esters of mono and diglycerides of edible fatty acids, saccharose esters of fatty acids, polyglycerol esters of fatty acids, polyglycerol esters of interesterified castor oil acid (E476), sodium stearoyllatylate, sodium lauryl sulfate and sorbitan esters of fatty acids and polyoxyethylated hydrogenated castor oil (e.g. the product sold under the trade name CREMOPHOR), block copolymers of ethylene oxide and propylene oxide (e.g. products sold under trade names PLURONIC and POLOXAMER), polyoxyethylene fatty alcohol ethers, polyoxyethylene sorbitan fatty acid esters, sorbitan esters of fatty acids and polyoxyethylene steraric acid esters.

Particularly suitable solubilisers are polyoxyethylene stearates, such as for instance polyoxyethylene(8)stearate and polyoxyethylene(40)stearate, the polyoxyethylene sorbitan fatty acid esters sold under the trade name TWEEN, for instance TWEEN 20 (monolaurate), TWEEN 80 (monooleate), TWEEN 40 (monopalmitate), TWEEN 60 (monostearate) or TWEEN 65 (tristearate), mono and diacetyl tartaric acid esters of mono and diglycerides of edible fatty acids, citric acid esters of mono and diglycerides of edible fatty acids, sodium stearoyllactylate, sodium laurylsulfate, polyoxyethylated hydrogenated castor oil, block-copolymers of ethylene oxide and propyleneoxide and polyoxyethylene fatty alcohol ether. The solubiliser may either be a single compound or a combination of several compounds. The expression "solubiliser" is used in the present text to describe both possibilities; the solubiliser used must be suitable for use in food and/or medicine.

The gum base formulations applicable within the scope of the invention comprise a synthetic elastomer selected from polyisobutylene. e.g. having a gas pressure chromatography (GPC) average molecular weight in the range of about 10,000 to 1,000,000 including the range of 50,000 to 80,000, isobutylene-isoprene copolymer (butyl elastomer), styrene-butadiene copolymers e.g. having styrene-butadiene ratios of about 1:3 to 3:1, polyvinyl acetate (PVA), where the higher molecular weight polyvinyl acetates are typically used in bubble gum base, polyisoprene, polyethylene, vinyl acetate-vinyl laurate copolymer e.g. having a vinyl laurate content of about 5 to 50% by weight such as 10 to 45% by weight of the copolymer, and combinations hereof. It is common in the industry to combine in a gum base a synthetic elastomer having a high molecular weight and a low molecular weight elastomer. Presently preferred combinations of synthetic elastomers include, but are not limited to, polyisobutylene and styrene-butadiene, polyisobutylene and polyisoprene, polyisobutylene and isobutylene-isoprene copolymer (butyl rubber) and a combination of polyisobutylene, styrene-butadiene copolymer and isobutylene isoprene copolymer, and all of the above individual synthetic polymers in admixture with polyvinyl acetate, vinyl acetate-vinyl laurate copolymers, respectively and mixtures thereof. Particularly interesting elastomeric or resinous polymer compounds which advantageously can be used in a process according to the invention include polymers which, in contrast to currently used elastomers and resins, can be degraded physically, chemically or enzymatically in the environment after use of the chewing gum, thereby giving rise to less environmental pollution than chewing gums based on non-degradable polymers, as the used degradable chewing gum remnants will eventually disintegrate and/or can be removed more readily by physical or chemical means from the site where it has been dumped.

In the present context, useful elastomer plasticizers include, but are not limited to, natural rosin esters, often referred to as ester gums including as examples glycerol esters of partially hydrogenated rosins, glycerol esters of polymerised rosins, glycerol esters of partially dimerised rosins, glycerol esters of tally oil rosins, pentaerythritol esters of partially hydrogenated rosins, methyl esters of rosins, partially hydrogenated methyl esters of rosins and pentaerythritol esters of rosins. Other useful resinous compounds include synthetic resins such as terpene resins derived from alpha-pinene, beta-pinene, and/or d-limonene, natural terpene resins; and any suitable combinations of the foregoing. The choice of elastomer plasticizers will vary depending on the specific application, and on the type of elastomer(s) being used.

In some embodiments of the invention, the composition may also be used as a powder in various application forms. It is noted that additional ingredients may be present in the powder.

One application form of the powder according to the invention is a flow-pack. In this application form, the composition, optionally with additional ingredients, may be administered directly for oral use. In some embodiments, the flow-pack is designed to only allow a particular dose for oral use. A particular advantage of these embodiments may be an instantaneous generation of saliva upon oral administration.

In some embodiments of the invention, the oral composition may also be present in a pouch as a powder. Hence, this aspect of the invention includes the oral composition in a pouch without tableting, but as a powder or part of a powder with other powders or powder ingredients. It follows that the directly compressible (DC) and non-directly compressible (non-DC) sugar alcohol particles of the invention may be included in the pouch according to the invention. Additional embodiments pertaining to the oral composition of the invention will also be applicable when included in a pouch. It is noted that additional ingredients may be present in the pouch, such as water-soluble fibers or water-insoluble fibers, including microcrystalline cellulose.

According to an advantageous embodiment of the invention, the pouch comprises a water-permeable membrane, such as a woven or non-woven fabric.

The pouches according to the invention comprise openings, where the characteristic opening dimension is adapted to a characteristic dimension of the oral composition so as to retain the matrix composition inside the pouch before use and/or to retain a part of the content inside the pouch during use.

In other words, according to the various embodiments, the pouch forms a membrane allowing passage of saliva and prevents or inhibits passage of at least a part of the content. The membrane of the pouch may be of any suitable material e.g. woven or non-woven fabric (e.g. cotton, fleece etc.), heat sealable non-woven cellulose or other polymeric materials such as a synthetic, semi-synthetic or natural polymeric material. An example of suitable pouch material is paper made of pulp and a small amount of wet strength agent. A material suitable for use must provide a semi-permeable membrane layer to prevent the powder or composition from leaving the bag or pouch during use. Suitable materials are also those that do not have a significant impact on the release of the active ingredients from the pouch.

The powder is filled into pouches and is maintained in the pouch by a sealing. An ideal pouch is chemically and physically stable, it is pharmaceutically acceptable, it is insoluble in water, it is easy to fill with powder and seal, and it provides a semi-permeable membrane layer which prevent the powder from leaving the bag, but permit saliva and therein dissolved or sufficiently small suspended components from the powder in the pouch to pass through said pouch.

The pouch may be placed in the oral cavity by the user. Saliva then enters into the pouch, and the active ingredient and other components, which are soluble in saliva, start to dissolve and are transported with the saliva out of the pouch into the oral cavity. In some embodiments of the invention, the pouch may be masticated in a similar way as chewing a gum. This is particularly advantageous when the oral composition comprise gum base. Hence, the pouch may be masticated into a coherent residual containing water-insoluble components.

Typically, the pouches comprise openings, where the characteristic opening dimension is adapted to a characteristic dimension of the matrix composition so as to retain the matrix composition inside the pouch before use and/or to retain a part of the matrix composition, such as an insoluble composition, inside the pouch during use.

In order to obtain a pouch having suitable opening dimensions in view of the matrix composition to be used, the material for the pouch may be selected accordingly, e.g. comprising e.g. wowen or non-wowen fabric.

In other words, according to the various embodiments, the pouch forms a membrane allowing passage of saliva and prevents or inhibits passage of said water-insoluble composition. The membrane of the pouch may be of any suitable material e.g. wowen or non-wowen fabric (e.g. cotton, fleece etc.), heat sealable non-wowen cellulose or other polymeric materials such as a synthetic, semi-synthetic or natural polymeric material. An example of suitable pouch material is paper made of pulp and a small amount of wet strength agent. A material suitable for use must provide a semi-permeable membrane layer to prevent the powder or composition from leaving the bag or pouch during use. Suitable materials are also those that do not have a significant impact on the release of active ingredients from the pouch.

The powder is filled into pouches and is maintained in the pouch by a sealing. An ideal pouch is chemically and physically stable, it is pharmaceutically acceptable, it is insoluble in water, it is easy to fill with powder and seal, and it provides a semi-permeable membrane layer which prevent the powder from leaving the bag, but permit saliva and therein dissolved or sufficiently small suspended components from the powder in the pouch, such as active ingredients, to pass through said pouch.

The pouch may be placed in the oral cavity by the user. Saliva then enters into the pouch, and the one or more active ingredients and other components, which are soluble in saliva, start to dissolve and are transported with the saliva out of the pouch into the oral cavity, where the active ingredient may be absorbed.

According to an embodiment of the invention, the matrix composition may further comprise one or more enhancers.

In an embodiment of the invention, said enhancers are selected from the group consisting of bile salts, cetomacrogols, chelating agents, citrates, cyclodextrins, detergents, enamine derivatives, fatty acids, labrasol, lecithins, phospholipids, syntetic and natural surfactants, nonionic surfactants, cell envelope disordering compounds, solvents, steroidal detergents, chelators, solubilization agents, charge modifying agents, pH control agents, degradative enzyme inhibitors, mucolytic or mucus clearing agents, membrane penetration-enhancing agents, modulatory agents of epithelial junction physiology, vasodilator agents, selective transport-enhancing agents, or any combination thereof pH control agents include buffers.

According to an embodiment of the invention, the enhancer comprises one or more pH control agent, such as a buffering agent.

In an embodiment of the invention, said pH control agents are selected from the group consisting of Sodium carbonate, Sodium bicarbonate, Potassium carbonate, Calcium carbonate, Magnesium carbonate, Magnesium oxide, or any combination thereof.

According to an embodiment of the invention, the water-insoluble composition comprises cellulose, e.g. as a carrier. In an embodiment of the invention the cellulose is or comprises microcrystalline cellulose. One advantage of the above embodiment may be that microcrystalline cellulose may absorb a relatively high amount of active ingredient, while also allowing for the one or more active ingredients to be effectively released from the pouch during use.

The cellulose may be synthetic or semisynthetic celluloses, or it may be derived from natural celluloses. It is normally crystalline such as microcrystalline. Certain specific embodiments may also utilize other forms of carriers, in addition to or including mcc, such as but not limited to fibrous material or carbohydrates including cellulose (including hemicellulose, celluloses with different crystallinities and structures (e.g. varying structures including solid fibers, and addition or including fibers or the like in various structures such as web-like structures and/or other structures), including naturally occurring celluloses including *Cladophora* sp. Algae cellulose or the like), dextran, agarose, agar, pectin, alginate, xanthan, chitosan, starch (including potato starch, shoti starch) etc. or mixtures thereof.

The microcrystalline cellulose may be selected from the group consisting of AVICEL® grades PH-100, PH-102, PH-103, PH-105, PH-112, PH-113, PH-200, PH-300, PH-302, VIVACEL® grades 101, 102, 12, 20 and EMOCEL® grades 50M and 90M, and the like, and mixtures thereof.

In an embodiment of the invention said cellulose is provided in the form of particles having an average particle size between 1 and 1000 micrometers, such as between 10 and 250 micrometers, such as between 15 and 200 micrometers, such as between 20 and 150 micrometers, such as between 50 and 100 micrometers, such as about 75 micrometers.

In an embodiment of the invention said cellulose has a specific surface area of between 0.65 and 1.5 $m^2/g$, such as between 0.75 and 1.25 $m^2/g$, such as between 0.85 and 1.15 $m^2/g$, such as between 0.9 and 1.1 $m^2/g$, such as about 0.95 $m^2/g$, about 1.00 $m^2/g$, or such as about 1.05 $m^2/g$.

In an embodiment of the invention said cellulose has a bulk density between 0.1 and 1.0 grams per cubic centimeter ($g/cm^3$), such as between 0.25 and 0.5 grams per cubic centimeter, such as between 0.26 and 0.31 grams per cubic centimeter, or such as between 0.28 and 0.33 grams per cubic centimeter.

In the context of the above embodiment it should preferably be understood that the bulk density of the cellulose is understood as the bulk density at about 25 degrees Celsius.

In an embodiment of the invention said cellulose has a porosity characterized by an average specific pore volume between 0.003 $cm^3/g$ and 0.60 $cm^3/g$, such as between 0.01 and 0.3 $cm^3/g$.

In an embodiment of the invention said cellulose has a moisture content of less than about 5% by weight, such as between 2 and 5% by weight, such as between 3 and 5% by weight, such as about 4% by weight.

Various types of usable cellulose includes microcrystalline cellulose (MCC); carboxymethylcellulose (CMC), such as sodium carboxymethylcellulose; hydroxypropyl methylcellulose (HPMC); methylcellulose; ethylcellulose (EC); methylethylcellulose (MEC); hydroxyethyl cellulose (HEC); hydroxyethyl methylcellulose (HEMC); and any combination thereof.

In an embodiment of the invention said cellulose has an average fiber size of less than 200 micrometers, such as between 75 and 125 micrometers, or such as below 75 micrometers. In an embodiment of the invention the cellulose comprises pores, the pores having an average pore size of between about 3 nanometers and about 300 nanometers, such as between 10 nanometers and 200 nanometers, such as between 20 nanometers and 100 nanometers.

In an embodiment of the invention said cellulose is derived from natural sources, such as wood pulp. Other examples of natural sources of cellulose include sugar beet fiber, cotton fiber, bran fiber, citrus pulp fiber, grass fiber, willow fiber, poplar fiber, bamboo fiber, and combinations thereof, or combinations thereof with wood pulp. In some embodiments, the cellulose can be chemically treated, e.g. by means of CMC, MPMC, HPC, MCC, and/or other methods. Alternatively, the cellulose may be semi-synthetic or synthetic cellulose.

According to various embodiments of the invention, sugar alcohols may be included in the pouch as a matrix composition or part thereof as a humectant, or as a sweetener. Suitable sugar alcohols include sugar alcohols selected from the group of sorbitol, erythritol, xylitol, lactitol, maltitol, mannitol, hydrogenated starch hydrolyzates, isomalt, or any combination thereof.

In an embodiment of the invention the pouch comprises high intensity sweetener. Preferred high intensity sweeteners include, but are not limited to sucralose, aspartame, salts of acesulfame, such as acesulfame potassium, alitame, saccharin and its salts, cyclamic acid and its salts, glycyrrhizin, dihydrochalcones, thaumatin, monellin, stevioside and the like, alone or in combination. In an embodiment of the invention, the pouch comprises bulk sweeteners including sugar and/or sugarless components.

In an embodiment of the invention, the pouch comprises bulk sweetener in the amount of 5 to about 95% by weight of the pouch, more typically constitute 20 to about 80% by weight of the pouch, and more commonly, 30 to 60% by weight of the pouch. Bulk sweeteners may function both as a sweetener and also as a humectant.

Sugar sweeteners generally include, but are not limited to saccharide-containing components commonly known in the art of pouches, such as sucrose, dextrose, maltose, saccharose, lactose, sorbose, dextrin, trehalose, D-tagatose, dried invert sugar, fructose, levulose, galactose, corn syrup solids, glucose syrup, hydrogenated glucose syrup, and the like, alone or in combination. These sugar sweeteners may also be included as a humectant.

The sweetener can be used in combination with sugarless sweeteners. Generally, sugarless sweeteners include components with sweetening characteristics but which are devoid of the commonly known sugars and comprise, but are not limited to, sugar alcohols, such as sorbitol, mannitol, xylitol, hydrogenated starch hydrolyzates, maltitol, isomalt, erythritol, lactitol and the like, alone or in combination. These sugarless sweeteners may also be included as a humectant.

In various embodiments of the invention, the matrix composition comprises a release controlling composition for controlling the release of the matrix composition and/or parts thereof, especially the one or more active ingredients.

The release controlling composition may, according to various embodiments, be selected group consisting of metallic stearates, modified calcium carbonate, hydrogenated vegetable oils, partially hydrogenated vegetable oils, polyethylene glycols, polyoxyethylene monostearates, animal fats, silicates, silicates dioxide, talc, magnesium stearates, calcium stearates, fumed silica, powdered hydrogenated cottonseed oils, hydrogenated vegetable oils, hydrogenated soya oil and mixtures thereof. Particularly, metallic stearates, such as magnesium stearate may be advantageous.

The release controlling composition may be added to the matrix composition in various ways. For example, the release controlling composition may be added by full powder mixture during the last few minutes of the final mixing. Alternatively, the release controlling composition may be added after the granulation steps on a granulation premix. Still further, the release controlling composition may be added only as a fraction of the matrix composition so two different release profiles of active ingredients are achieved. Even further two or more fractions of the matrix composition may comprise different amounts of the release controlling composition, if any, thereby providing a more complex and tailored release profile of active ingredients.

The release controlling composition, such as magnesium stearate, may have a sealing effect and can be used to control the release of the one or more active ingredients and the solubility of the matrix composition. According to an embodiment of the invention, the pouch comprises polyvinylpyrrolidone (PVP). One advantage of the above embodiment may be that a more uniform composition may be obtained. In some embodiments of the invention, the oral composition comprises non-directly compressible (non-DC) sugar alcohol particles. In the present context, the non-DC sugar alcohol particles are understood and defined by the skilled person with reference to their typical commercial trade grade. In an embodiment of the invention, the non-DC sugar alcohol particles have not been granulated. Thus, the non-DC sugar alcohol particles are provided as non-granulated particles.

These are typically available in a non-DC form of the relevant sugar alcohol as particles which have not been preprocessed by granulation with other sugar alcohols or binders for the purpose of obtaining so-called direct compressible particles (DC) on the basis of sugar alcohol particles which are by themselves not suitable for direct compression. Such non-DC particles of sugar alcohol may typically consist of the sugar alcohol. Therefore, non-DC sugar alcohol particles may typically be particles consisting of sugar alcohol, which is non-directly compressible in its pure form. Examples of sugar alcohols which are non-directly compressible when provided as particles consisting of the sugar alcohol in question include erythritol, xylitol, maltitol, mannitol, lactitol, isomalt, etc. Therefore, preferred non-DC grades of sugar alcohol may include pure sugar alcohol particles.

In an embodiment of the invention, the oral composition comprises at least two modules, where the one or more sugar alcohol particles is tableted into a first module and combined with a second oral composition that is tableted into a second module, and wherein the second module is different in composition than the first module.

In an embodiment of the invention, the oral composition comprises at least two modules, where the one or more sugar alcohol particles is tableted into a first module and combined with a second oral composition that is tableted into a second module, and wherein the first module includes said ion-exchange composition.

In the present context, "tableted into" is to be understood as also allowing other ingredients to be part of the tableted module. Hence, the module may comprise further ingredients apart from the one or more sugar alcohol particles.

In an embodiment of the invention, the oral composition comprises at least two modules, where the one or more sugar alcohol particles comprises directly compressible (DC) and non-directly compressible (non-DC) sugar alcohol particles, which are is tableted into a first module and combined with a second oral composition that is tableted into a second module, and wherein the second module is different in composition than the first module.

In an embodiment of the invention, the oral composition comprises at least two modules, where the one or more sugar alcohol particles comprises directly compressible (DC) and non-directly compressible (non-DC) sugar alcohol particles, which are is tableted into a first module and combined with a second oral composition that is tableted into a second module, and wherein the first module includes said ion-exchange composition.

One advantage of the above embodiment may be that the second module may have a higher mechanical strength, e.g. by means of a different composition comprising e.g. a very large amount of direct compressible ingredients, such as DC sugar alcohols.

A further advantage of the above embodiment may be that the second module may have a higher loading capacity for e.g. active ingredients, partly due to the higher obtainable mechanical strength achievable by large amounts of direct compressible ingredients, such as DC sugar alcohols.

Thus, in the above embodiment said oral composition is tableted into a first module, and wherein the tablet further comprises a second oral composition that is tableted into a second module. The first module may be tableted before the second module, or vice versa. In some embodiments, the tablet may comprise one or more further modules.

In an embodiment of the invention the oral composition comprises at least two modules. A tablet comprising two or more modules will have module sizes which each are comparable to the volume of the complete tablet. Comparable in the present context means that the modules are not understood as small particles and a module should at least be greater than 1/20 of the complete tablet volume, preferably greater than 1/10 of the complete tablet volume.

In the present context, a module is intended to mean a plurality of particles being compressed together to form a gathered module of particles.

In an embodiment of the invention the oral composition comprises a plurality of oral composition modules. In the present context the application of e.g. two modules are in particular advantageous as the use of non-DC sugar alcohols by nature may result in a more fragile tablet or at least the module in which the non-DC sugar alcohols are. In other words, non-DC sugar alcohols may be present primarily in one module thereby optimizing the desired salivation and sensory experience from the module and the tablet as such whereas another module may serve as a support ensuring that the desired stability and friability of the complete tablet is obtained.

According to an embodiment of the invention, the tablet has two modules. Optionally, a coating may be applied around the two modules to form the final tablet.

An advantage of using two modules is described above, but it should also be noted that this effect may also be obtained when applying layers of very different nature. Such application may e.g. include the use of a gum module and a non-gum module, where the non-gum modules are containing the non-DC sugar alcohol particles. In this way, the non-gum layer may release the advantageous non-DC sugar alcohols and the gum layer may both stabilize the tablet as described above but also interact with the non-DC sugar alcohols during in particular the initial release for establishment of a very pleasant and impressing initial chew phase. This includes an increased saliva and moisture experience.

In an embodiment of the invention, the oral composition comprises at least two modules, where the one or more sugar alcohol particles is tableted into a first module and combined with a second oral composition that is tableted into a second module, and wherein the second module includes gum base.

In an embodiment of the invention, the oral composition comprises at least two modules, where the one or more sugar alcohol particles comprises directly compressible (DC) and non-directly compressible (non-DC) sugar alcohol particles, which are is tableted into a first module and combined with a second oral composition that is tableted into a second module, and wherein the second module includes gum base.

In an embodiment of the invention said oral composition is tableted into a first module and combined with a second oral composition that is tableted into a second module, and wherein the second module does not comprise non-DC sugar alcohol particles.

In one embodiment, the second oral composition comprises a large amount of DC sugar alcohols, such as larger amounts than the first oral composition. For example, the second oral composition may comprise at least 30% by weight of DC sugar alcohols, such as at least 50% by weight of DC sugar alcohols, such as at least 70% by weight of sugar alcohols. In an example embodiment, the second oral composition may comprise between 50 and 99.9% by weight of sugar alcohols, such as between 70 and 99% by weight of sugar alcohols. The amount of DC sugar alcohol may depend on the type and amount of active ingredient applied in the tablet.

In an embodiment of the invention said oral composition is tableted into a first module and combined with a second oral composition that is tableted into a second module, and wherein the second module is a an orally disintegrating tablet (ODT).

In an embodiment of the invention, the tablet comprises said non-DC sugar alcohol particles in an amount of at least 10% by weight of the tablet. In an embodiment of the invention, the tablet comprises said non-DC sugar alcohol particles in an amount of at least 20% by weight of the tablet. In an embodiment of the invention, the tablet comprises said non-DC sugar alcohol particles in an amount of at least 30% by weight of the tablet. In an embodiment of the invention, the first module comprises said non-DC sugar alcohol particles in an amount of at least 30% by weight of the first module. In an embodiment of the invention, the first module comprises said non-DC sugar alcohol particles in an amount of at least 40% by weight of the first module.

In an embodiment of the invention, said DC sugar alcohol particles comprises sugar alcohols selected from DC particles of sorbitol, erythritol, xylitol, lactitol, maltitol, mannitol, isomalt, and combinations thereof. Sorbitol is an example of a sugar alcohol, which is considered DC grade, when provided as particles consisting of sorbitol, i.e. in its pure form. On the other hand, several other sugar alcohols are considered non-DC grade if providing them as particles consisting of the specific sugar alcohol. Therefore, such non-DC sugar alcohols are conventionally processed into DC grade sugar alcohols, e.g. by granulating them with e.g. a binder. Examples of trade grades of DC sugar alcohols include sorbitol particles provided as e.g. Neosorb® P 300 DC from Roquette, mannitol particles provided as e.g. Pearlitol® 300DC or Pearlitol 200 SD from Roquette, maltitol provided as e.g. SweetPearl® P 300 DC, xylitol provided as e.g. Xylisorb® 200 DC or Xylitab 200 from Dupont.

In an embodiment of the invention, the tablet comprises said DC sugar alcohol particles in an amount of at least 10% by weight of the tablet. In an embodiment of the invention, the tablet comprises said DC sugar alcohol particles in an amount of at least 20% by weight of the tablet. In an embodiment of the invention, the tablet comprises said DC sugar alcohol particles in an amount of at least 30% by weight of the tablet. According to an embodiment of the invention, said oral composition comprises DC sugar alcohol particles in an amount of at least 10% by weight. According to an embodiment of the invention, the first module comprises DC sugar alcohol particles in an amount of at least 10% by weight. According to an embodiment of the invention, the first module comprises said DC sugar alcohol particles in an amount of at least 10% by weight of the first module. According to an embodiment of the invention, the first module comprises said DC sugar alcohol particles in an amount of at least 30% by weight of the first module. In an embodiment of the invention, the second module comprises DC sugar alcohol particles in an amount of at least 30% by weight of the second module. In an embodiment of the invention, the second module comprises DC sugar alcohol particles in an amount of at least 50% by weight of the second module. In an embodiment of the invention, the second module comprises DC sugar alcohol particles in an amount of at least 70% by weight of the second module. In an embodiment of the invention, the second module comprises DC sugar alcohol particles in an amount of at least 90% by weight of the second module. In an embodiment of the invention the DC sugar alcohol particles in the second module are selected from DC particles of sorbitol, erythritol, xylitol, lactitol, maltitol, mannitol, isomalt, and combinations thereof.

In an embodiment of the invention, the tablet comprises one or more binders other than binders forming part of the DC sugar alcohol particles in an amount of 0.1 to 6% by weight of the tablet.

Suitable binders include Gum Arabic, Methyl Cellulose, Liquid glucose, Tragacanth, Ethyl Cellulose, Gelatin, Hydroxy Propyl Methyl Cellulose (HPMC), Starches, Hydroxy Propyl Cellulose (HPC), Pregelatinized Starch, Sodium Carboxy Methyl Cellulose (NaCMC), Alginic Acid, Polyvinyl Pyrrolidone (PVP), Maltodextrine (MD); Cellulose, Polyethylene Glycol (PEG), Polyvinyl Alcohols, Polymethacrylates, Copovidone or Microcrystalline Cellulose (MCC), alone or in combination.

According to an embodiment of the invention, the one or more binders comprises one or more cellulose binders. In an embodiment of the invention the one or more binders comprises microcrystalline cellulose (MCC), hydroxypropyl cellulose (HPC) or hydroxypropylmethyl cellulose (HPMC) or any combination thereof. In an embodiment of the invention the oral composition comprises hydroxypropyl cellulose (HPC) binder in the amount of 0.1 to 6% by weight of the tablet, such as 0.1 to 5%, such as 0.1 to 4%, such as 0.1 to 3%, such as 0.1 to 2% by weight of the tablet. HPC may be applied as a particular attractive binder. Thus, this binder, when used with non-DC sugar alcohols such as erythritol, exhibits an advantageous sensory experience when compared to other well-known binders. In particular, the user of HPC lower than 4% by weight of the tablet is advantageous, such as 0.1 to 3%, such as 0.1 to 2% by weight of the tablet.

In an embodiment of the invention the non-DC sugar alcohol particles are particles that are not granulated, and the one or more binders are present as separate components in the tablet.

In an embodiment of the invention, the tablet has a weight ratio between said non-DC sugar alcohol particles and said DC sugar alcohol particles, which is between 0.2 and 1.2. In an embodiment of the invention, the tablet has a weight ratio between said non-DC sugar alcohol particles and said DC sugar alcohol particles, which is between 0.3 and 1.0. In an embodiment of the invention, the tablet has a weight ratio between said non-DC sugar alcohol particles and said DC sugar alcohol particles, which is between 0.3 and 0.7.

The weight ratio between non-DC sugar alcohol particles and DC sugar alcohol particles have proven significant according to an embodiment of the invention in the sense that a relatively high amount of non-DC sugar alcohol particles must be present in order to obtain the mouthfeel and taste obtained through the invention. However, this taste and mouthfeel also resides in the DC sugar alcohol particles. An example of such DC sugar alcohol particle is DC grade xylitol, which, together with the non-DC sugar alcohol particles may provide a mouthfeel which is unique and very attractive to test panels.

In an embodiment of the invention, the tablet comprises particles comprising gum base, and wherein the tablet is designed to be masticated into a coherent residual containing water-insoluble components. In an embodiment of the invention, the oral composition contains particles comprising gum base, and wherein the gum base comprises at least 5% by weight of elastomer.

In the following raw materials will refer to the mixed particles to be compressed into a tablet according to embodiments of the invention unless otherwise stated.

The following description outlines explanations of how the tablet of the invention may be produced and further details of what may be added to the inventive composition.

Typically, the process of manufacture of the inventive tablet may be performed in a single tablet press, such as a rotary tablet press. But it may be a benefit under some circumstances to apply a separate tablet press. Preferably, the upper punch is convex which gives the upper face of the pressed tablet a concave form. It should of course be noted that the shape of the punches may vary depending of the desired tablet shape. In some embodiments of the invention, pressing of the tablets are performed at a force of 20 to 50 kN.

In a further embodiment, sucrose fatty acid esters may also be utilized for increased release of sweeteners including for instance the so-called highly potent sweeteners, such as for instance saccharin, cyclamate, aspartame, thaumatin, dihydrocalcones, stevioside, glycyrrhizin or salts or compounds thereof.

When including gum base in the formulation sugar alcohols typically constitute from about 5 to about 95% by weight of the tablet, more typically about 20 to about 80% by weight such as 30 to 70% or 30 to 60% by weight of the tablet.

In such an embodiment of the invention, the tablet further comprises, beside the already described sugar alcohols, materials selected from the group consisting of bulk sweeteners, dry-binders, tableting aids, anti-caking agents, emulsifiers, antioxidants, enhancers, absorption enhancers, buffers, high intensity sweeteners, softeners, colors, or any combination thereof.

High intensity artificial sweetening agents can also be used alone or in combination with the above sweeteners. Preferred high intensity sweeteners include, but are not limited to sucralose, aspartame, salts of acesulfame, alitame, saccharin and its salts, cyclamic acid and its salts, glycyrrhizin, dihydrochalcones, thaumatin, monellin, stevioside (natural intensity sweetener) and the like, alone or in combination. In order to provide longer lasting sweetness, it may be desirable to encapsulate or otherwise control the release of at least a portion of the artificial sweeteners. Techniques such as wet granulation, wax granulation, spray drying, spray chilling, fluid bed coating, conservation, encapsulation in yeast cells and fiber extrusion may be used to achieve desired release characteristics. Encapsulation of sweetening agents can also be provided using another tablet component such as a resinous compound.

Usage level of the artificial sweetener will vary considerably and will depend on factors such as potency of the sweetener, rate of release, desired sweetness of the product and cost considerations. Thus, the active level of artificial sweetener may vary from about 0.001 to about 8% by weight (preferably from about 0.02 to about 8% by weight). When carriers used for encapsulation are included, the usage level of the encapsulated sweetener will be proportionately higher. Combinations of sugar and/or non-sugar sweeteners may be used in the tablet formulation.

A tablet according to the invention may, if desired, include one or more fillers/texturisers including as examples, magnesium and calcium carbonate, sodium sulphate, ground limestone, silicate compounds such as magnesium and aluminum silicate, kaolin and clay, aluminum oxide, silicium oxide, talc, titanium oxide, mono, di- and tri-calcium phosphates, cellulose polymers and combinations thereof.

In some embodiments of the invention, the oral composition is comprised in a liquid, such as a carrier liquid, such as a mouthspray.

As used herein the term "carrier liquid" is intended to refer to a carrier liquid suitable for use in a mouth spray. One important limitation in embodiments of the invention is that the carrier liquid may be pharmaceutically acceptable, and may thus typically be composed from one or more pharmaceutically acceptable excipients.

According to an advantageous embodiment of the invention said carrier liquid is chosen from group consisting of water; alcohols, such as ethanol, propylene glycol, polyethylene glycol such as PEG 400, glycerol, and other similar alcohols; and mixtures or combinations thereof.

According to an embodiment of the invention, the carrier liquid comprises, if comprising water, at least one component selected from the group consisting of alcohols, such as ethanol, propylene glycol, polyethylene glycol such as PEG 400, glycerol, and other similar alcohols, and mixtures or combinations thereof.

According to an advantageous embodiment of the invention said carrier liquid comprises a substance selected from the group alcohols, such as ethanol, propylene glycol, polyethylene glycol such as PEG 400, glycerol, and other similar alcohols, and mixtures or combinations thereof.

According to an embodiment of the invention said carrier liquid comprises water. Water may e.g. be present in an amount of 0.1 to 99.9 percent by weight of the liquid active ingredient composition.

According to an embodiment of the invention said carrier liquid comprises ethanol. Ethanol may e.g. be present in an amount of 0.1 to 99.9 percent by weight of the liquid active ingredient composition.

According to an embodiment of the invention said carrier liquid comprises propylene glycol. Propylene glycol may e.g. be present in an amount of 0.1 to 99.9 percent by weight of the liquid active ingredient composition.

According to an embodiment of the invention said carrier liquid comprises glycerol. Glycerol may e.g. be present in an amount of 0.1 to 99.9 percent by weight of the liquid active ingredient composition.

According to an embodiment of the invention said carrier liquid comprises polyethylene glycol, such as PEG-400. Polyethylene glycol, such as PEG-400, may e.g. be present in an amount of 0.1 to 99.9 percent by weight of the liquid active ingredient composition.

According to an advantageous embodiment of the invention the liquid composition is for oromucosal administration.

According to an embodiment of the invention the desired administration may be influenced by controlling the size distribution of produced aerosols, e.g. the average diameter of the aerosols.

According to an advantageous embodiment of the invention the liquid composition further comprises sweetener, such as an artificial sweetener, such as sucralose.

According to an embodiment of the invention, said sweetener is included in amounts of between 0.1 and 5 percent by weight of the liquid active ingredient composition, such as between 0.2 and 3 percent by weight of the liquid active ingredient composition, such as between 0.5 and 2 percent by weight of the liquid active ingredient composition.

EXAMPLES

The following non-limiting examples illustrate different variations of the present invention.

Example 1

Oral Analgesic Compositions with or without Nicotine

TABLE 1

Oral analgesic compositions.

|  | (25-01) | (25-02) | (34-06) | (34-04) | (34-02) | (25-07) |
|---|---|---|---|---|---|---|
| Nicotine API* | 3.09 | 6.18 | — | — | — | — |
| Na2CO3 | 5.0 | 10.0 | — | — | — | — |
| Eucalyptol | — | — | 10.0 | — | — | — |
| Oleic Acid | — | — | — | 10.0 | — | — |
| Camphor | — | — | — | — | 2.0 | — |
| WS-12 | — | — | — | — | — | 2.0 |
| Mannitol | 76.91 | 68.82 | 71.0 | 71.0 | 85.5 | 87.0 |
| Crospovidone | 8.0 | 8.0 | 7.5 | 7.5 | 7.5 | 7.5 |
| Syloid | — | — | 10.0 | 10.0 | 0.5 | — |
| Microcrystalline cellulose (MCC) | 5.0 | 5.0 | — | — | — | 2.5 |
| Magnesium Stearate | 2.0 | 2.0 | — | — | — | — |
| Sodium Stearyl Fumarate | — | — | 1.5 | 1.5 | 4.5 | 1.0 |
| Total | 100.0 | 100.0 | 100.0 | 100.0 | 100.0 | 100.0 |

Amounts of raw materials are given in mg.
*The nicotine API used contains 32.4% nicotine implying that a formulation with 3.088 mg API contains 1 mg of nicotine Examples of specific raw materials used in the table are as follows:
Nicotine may eg be nicotine bitartrate dihydrate (NBT)
Eucalyptol may eg be Eucalyptol Nat available from Symrise
Oleic acid may eg be NF-LQ-(MH) available from Croda Inc
Camphor may eg be Camphor USP available from Rochem International Inc
WS-12 may eg be Symcool WS-12 available from Symrise
Mannitol may eg be Pearlitol 200 SD available from Roquette
Crospovidone may eg be Kollidon CL-F available from BASF
Syloid may eg. be Syloid 244 FP or Syloid XDP 3050 available from Grace GmbH
Microcrystalline cellulose may eg be Avicel PH-102

Example 2

Fast Dissolving Tablets (FDT) with or without Nicotine
Fast disintegrating tablets (FDT) were prepared based on the compositions of Example 1. The tablets were prepared as follows:
Raw materials are weighed from bags or buckets into separate weighing containers. For formulations using Syloid, a premix is made by mixing *Eucalyptus* and Syloid XDP 3050, Camphor and Syloid 244 FP or Oleic acid and Syloid 244 FP respectively.
All excipients are sifted through an 800-micron sieve into a stainless steel or plastic bin in the following order:

Half the filler/bulk sweetener
The nicotine (if included) and all other excipients including premix, except magnesium stearate and sodium stearyl fumarate
The remaining half of the filler/bulk sweetener These are mixed in a Turbula mixer for 4-10 minutes at 25 RPM. Then lubricant, eg. magnesium stearate is sifted through an 800-micron sieve into the mixing bin, and the lubrication is conducted by additional mixing for 1-2 minutes at 25 RPM. The fill level of the mixing bin is kept between 40% and 70%, according to standardized practice. The lubricated powder blend is transferred to the hopper of a tableting machine.

The fast disintegrating tablets were manufactured on a lab scale machine, here RIVA Piccola bi-layer tablet press. Punch used: 7.00 mm, circular, shallow concave, D tooling. Tablet weight: 100.0 mg.

The tablet machine was commissioned by adjusting the fill depth and compression force so the weight and hardness of tablets matched the acceptance criteria. A pre-compression force could be included to avoid capping.

TABLE 2

Suggested start up parameters.

| Parameter | Target value |
|---|---|
| Speed | 10-20 rpm |
| Weight of FDT | 100 mg +/− 5% |
| Compression force | 2-8 kN |
| Thickness | N/A* |
| Friability (100 rpm) | <1% |

*The design of punches is not fixed. As the curvature impacts thickness, the thickness is not a fixed target at this time of development.

In vivo dissolution time of the fast disintegrating tablets was below 30 sec. The fast disintegrating tablets according to the invention may comprise coloring agents. According to the invention, the one or more antagonists are not considered taste masking flavoring agents and work in a different manner than taste masking flavoring agents by interaction with specific receptors and/or ion channels. According to an embodiment of the invention, the fast disintegrating tablets may comprise color agents and whiteners such as FD&C-type dyes and lakes, fruit and vegetable extracts, titanium dioxide and combinations thereof.

Example 3

Preparation of Samples for Testing

Samples were prepared based on the tablets from Example 2.

Tablets with a content of nicotine (25-01) and (25-02) were evaluated in a sensory panel and used as standards for nicotine irritation under the tongue, in the oral cavity and in the throat. These samples were applied in test conditions in a weight of 100 mg, corresponding to the weight of the tablets of Example 2.

Additionally, tablets without a content of nicotine (34-06), (34-04), (34-02) and (25-07) were combined with the nicotine tablets (25-01) and (25-02) in various configurations.

In some configurations, one of each of these tablets without nicotine was combined with one of the nicotine tablets to give samples of a nicotine tablet and a single antagonist tablet for evaluation in a sensory panel for nicotine irritation under the tongue, in the oral cavity and in the throat.

In some other configurations, two of each of these tablets without nicotine were combined with one of the nicotine tablets to give samples of a nicotine tablet and two antagonist tablets for evaluation in a sensory panel for nicotine irritation under the tongue, in the oral cavity and in the throat.

In some further configurations, three of each of these tablets without nicotine were combined with one of the nicotine tablets to give samples of a nicotine tablet and three antagonist tablets for evaluation in a sensory panel for nicotine irritation under the tongue, in the oral cavity and in the throat.

Various fractions of the antagonist tablets were applied in combination with one of the nicotine tablets in the various configurations as outlined above for evaluation in a sensory panel for nicotine irritation under the tongue, in the oral cavity and in the throat.

For instance, in one sample one of the nicotine tablets (25-01) was combined with a fraction of 0.5 times the antagonist tablet (25-07), giving a total of 150 mg sample.

In another sample one of the nicotine tablets (25-01) was combined with a fraction of 0.1 times the antagonist tablet (34-06), giving a total of 110 mg sample.

In yet another sample one of the nicotine tablets (25-01) was combined with both a fraction of 0.5 times the antagonist tablet (25-07) and a fraction of 0.1 times the antagonist tablet (34-06), giving a total of 160 mg sample.

Also, one of the nicotine tablets (25-01) was for instance combined with both a fraction of 0.5 times the antagonist tablet (25-07), a fraction of 0.1 times the antagonist tablet (34-06), and a fraction of 0.1 times the antagonist tablet (34-02), giving a total of 170 mg sample.

Example 4

Samples for Testing

Samples were made based on the procedure from Example 3.

TABLE 3

Samples prepared according to Example 3.

Figure 1B:
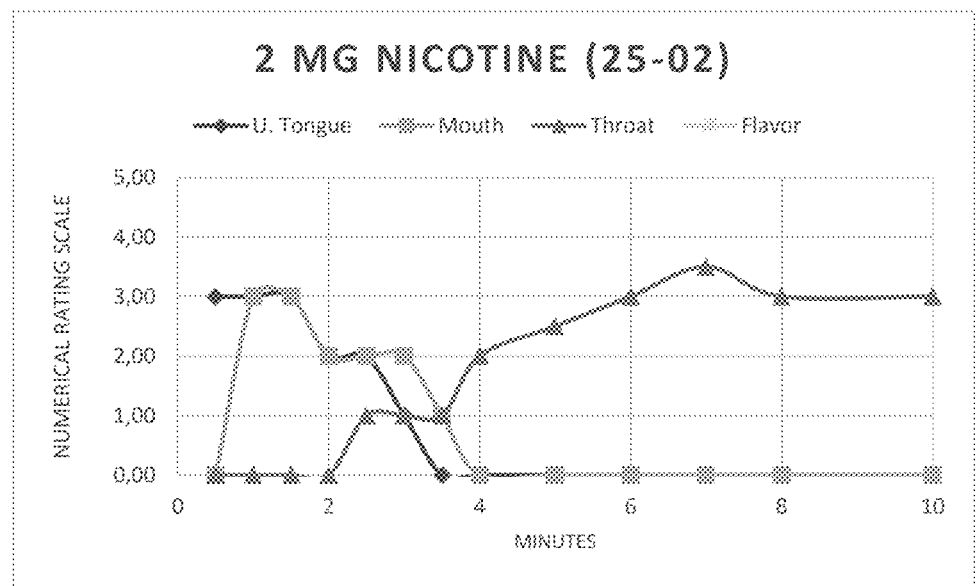
FIG. 1b shows a 2 mg nicotine fast disintegrating tablet (FDT) without antagonists.
Figure 1C:
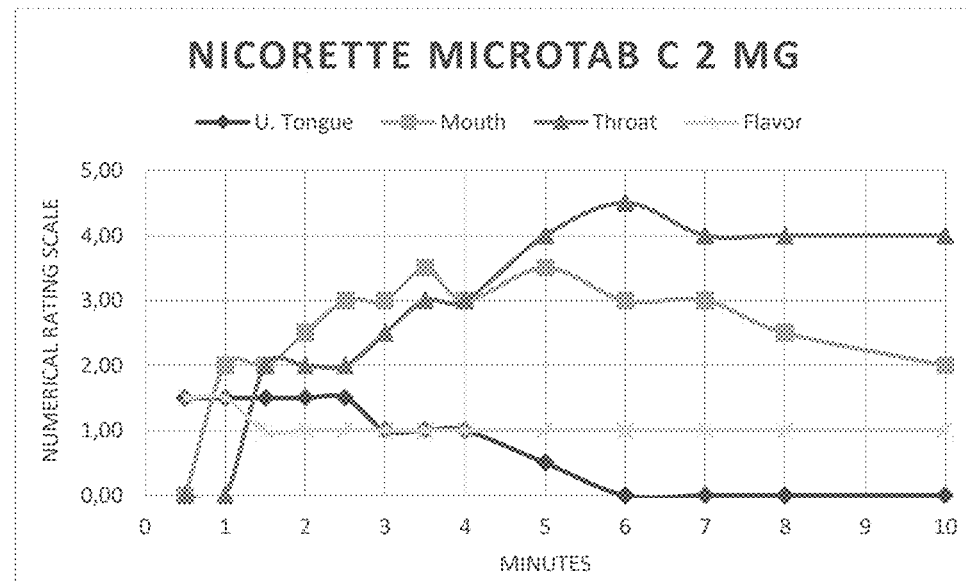
FIG. 1c shows a commercial 2 mg sublingual tablet.
Figure 1D:
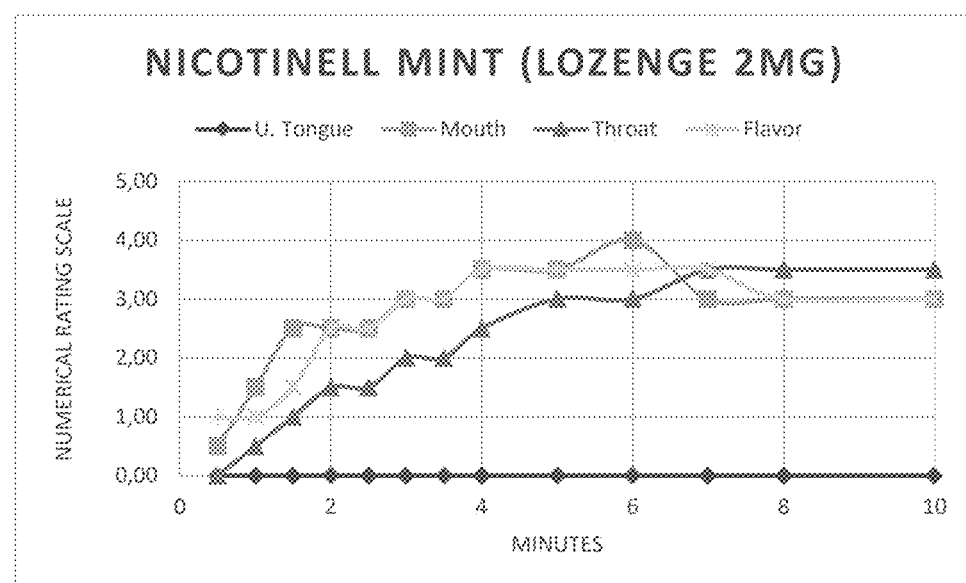
FIG. 1d shows a commercial 2 mg lozenge.
Figure 2A:
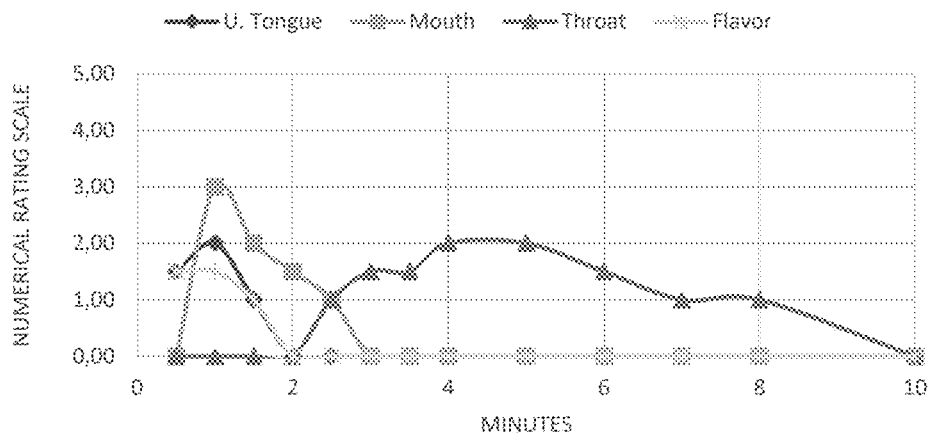
FIG. 2a shows a 1 mg nicotine tablet disclosed in FIG. 1a combined with 10% of a tablet with a content of eucalyptus but without nicotine.
Figure 2B:
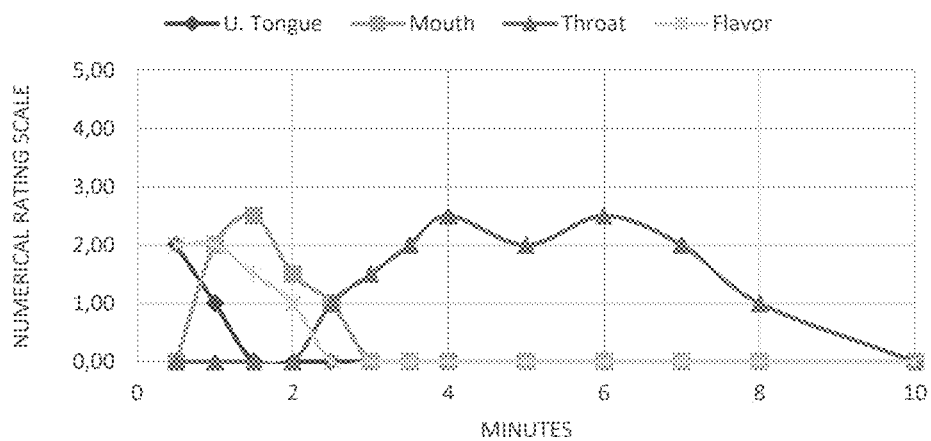
FIG. 2b shows a 1 mg nicotine tablet disclosed in FIG. 1a combined with 10% of a tablet with a content of camphor but without nicotine.
Figure 2C:
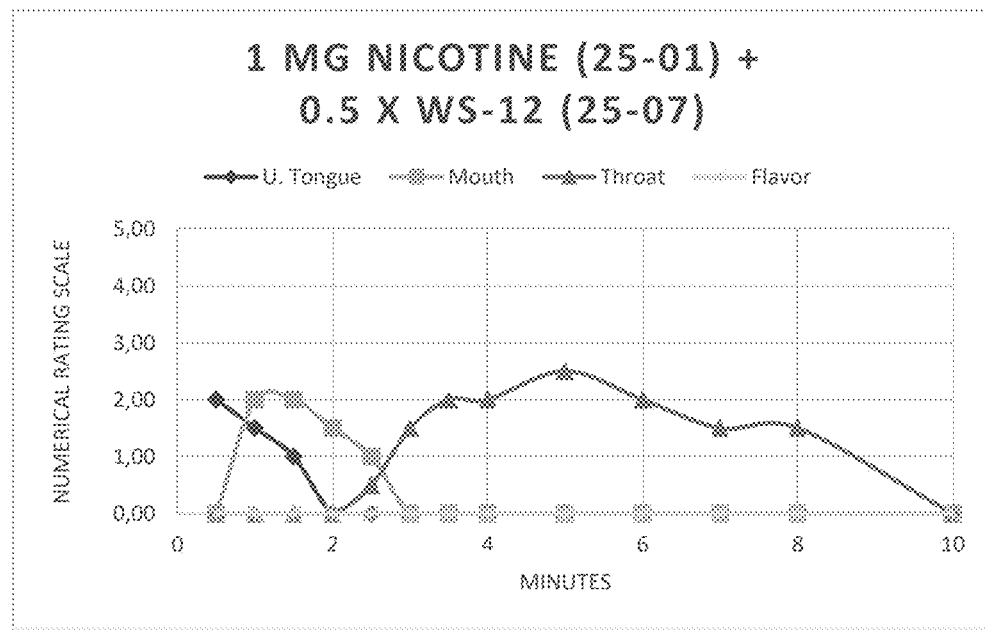
FIG. 2c shows a 1 mg nicotine tablet disclosed in FIG. 1a combined with 50% of a tablet with a content of WS-12 but without nicotine.
Figure 2D:
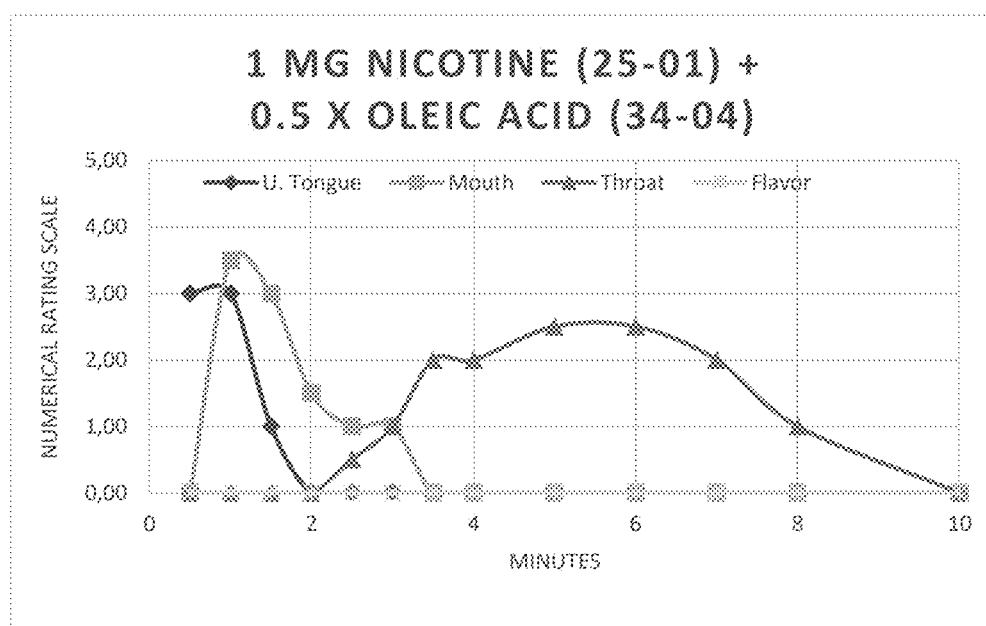
FIG. 2d shows a 1 mg nicotine tablet disclosed in FIG. 1a combined with 50% of a tablet with a content of oleic acid but without nicotine.
Figure 3A:
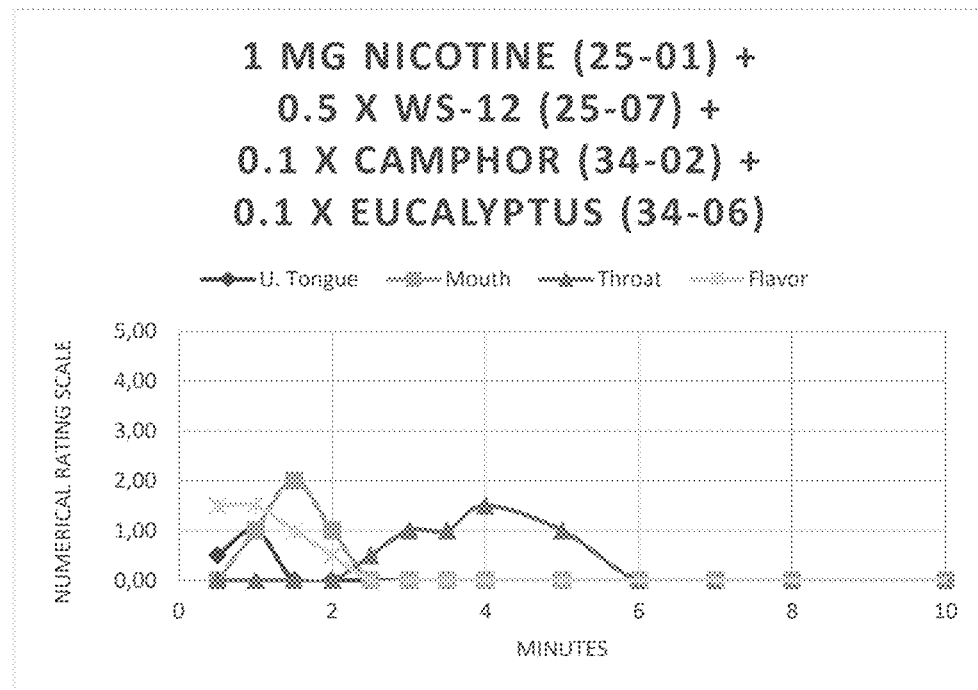
FIG. 3a shows a 1 mg nicotine tablet disclosed in FIG. 1a combined with 50% of a tablet with a content of WS-12, 10% of a tablet with a content of camphor, and 10% of a tablet with a content of eucalyptus, but without nicotine.
Figure 3B:
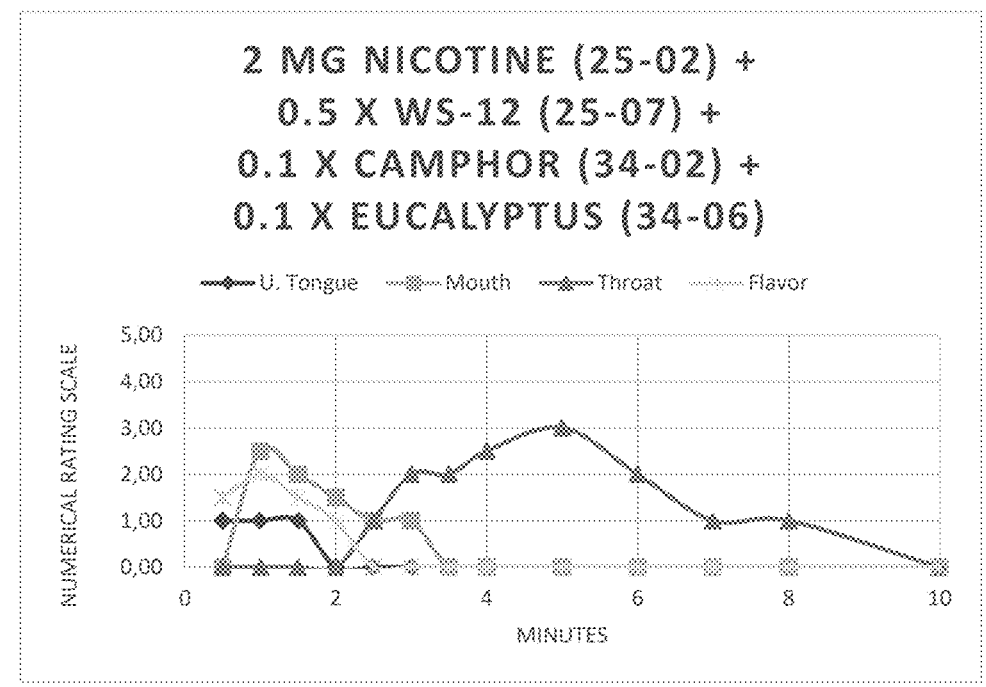
FIG. 3b shows a 2 mg nicotine tablet disclosed in FIG. 1b combined with 50% of a tablet with a content of WS-12, 10% of a tablet with a content of camphor, and 10% of a tablet with a content of eucalyptus, but without nicotine.

| | (25-01) | (25-02) | (34-06) | (34-04) | (34-02) | (25-07) |
|---|---|---|---|---|---|---|
| Sample 1 (FIG. 1a) | 1 | — | — | — | — | — |
| Sample 2 (FIG. 1b) | — | 1 | — | — | — | — |
| Sample 3 (FIG. 2a) | 1 | — | 0.1 | — | — | — |
| Sample 4 (FIG. 2d) | 1 | — | — | 0.5 | — | — |
| Sample 5 (FIG. 2b) | 1 | — | — | — | 0.1 | — |
| Sample 6 (FIG. 2c) | 1 | — | — | — | — | 0.5 |
| Sample 7 (FIG. 3a) | 1 | — | 0.1 | — | 0.1 | 0.5 |
| Sample 8 (FIG. 3b) | — | 1 | 0.1 | — | 0.1 | 0.5 |

Example 5

Samples for Testing with One Antagonist in Different Levels

Samples were made based on the procedure from Example 3.

TABLE 4

| | Samples prepared according to Example 3. | | | | | |
|---|---|---|---|---|---|---|
| | (25-01) | (25-02) | (34-06) | (34-04) | (34-02) | (25-07) |
| Sample 9 | 1 | — | 0.5 | — | — | — |
| Sample 10 | 1 | — | 1.0 | — | — | — |
| Sample 11 | 1 | — | — | 0.1 | — | — |
| Sample 12 | 1 | — | — | 1.0 | — | — |
| Sample 13 | 1 | — | — | — | 0.5 | — |
| Sample 14 | 1 | — | — | — | 1.0 | — |
| Sample 15 | 1 | — | — | — | — | 0.1 |
| Sample 16 | 1 | — | — | — | — | 1.0 |

Example 6

Samples for Testing with Two Antagonists in Different Levels

Samples were made based on the procedure from Example 3.

TABLE 5

| | Samples prepared according to Example 3 | | | | | |
|---|---|---|---|---|---|---|
| | (25-01) | (25-02) | (34-06) | (34-04) | (34-02) | (25-07) |
| Sample 17 | 1 | — | 0.1 | 0.5 | — | — |
| Sample 18 | 1 | — | 0.5 | 0.1 | — | — |
| Sample 19 | 1 | — | 0.1 | — | 0.1 | — |
| Sample 20 | 1 | — | 0.1 | — | 0.5 | — |
| Sample 21 | 1 | — | 0.5 | — | 0.1 | — |
| Sample 22 | 1 | — | 0.5 | — | 0.5 | — |
| Sample 23 | 1 | — | 0.1 | — | — | 0.5 |
| Sample 24 | 1 | — | 0.5 | — | — | 0.1 |
| Sample 25 | 1 | — | 0.5 | — | — | 0.5 |
| Sample 26 | 1 | — | — | 0.5 | 0.1 | — |
| Sample 27 | 1 | — | — | 0.1 | 0.5 | — |
| Sample 28 | 1 | — | — | 0.5 | — | 0.5 |
| Sample 29 | 1 | — | — | 0.1 | — | 0.1 |
| Sample 30 | 1 | — | — | — | 0.1 | 0.5 |
| Sample 31 | 1 | — | — | — | 0.5 | 0.1 |
| Sample 32 | 1 | — | — | — | 0.5 | 0.5 |

Example 7

Samples for Testing with Three Antagonists in Different Levels

Samples were made based on the procedure from Example 3.

TABLE 6

| | Samples prepared according to Example 3. | | | | | |
|---|---|---|---|---|---|---|
| | (25-01) | (25-02) | (34-06) | (34-04) | (34-02) | (25-07) |
| Sample 33 | 1 | — | 0.1 | — | 0.5 | 0.5 |
| Sample 34 | 1 | — | 0.1 | — | 1.0 | 0.5 |
| Sample 35 | 1 | — | 0.1 | — | 0.1 | 0.1 |
| Sample 36 | 1 | — | 0.1 | — | 0.1 | 1.0 |
| Sample 37 | 1 | — | 0.5 | — | 0.1 | 0.5 |
| Sample 38 | 1 | — | 1.0 | — | 0.1 | 0.5 |
| Sample 39 | 1 | — | 0.1 | 0.5 | 0.5 | 0.5 |
| Sample 40 | 1 | — | 0.1 | 0.1 | 0.5 | 0.5 |

Example 8

Samples for Testing with One Antagonist and Three Antagonists in Same Total Amount Samples 7-8 were made in the same way as in Example 3, except that the total content of antagonists in these samples were adjusted to the content of each of the samples with only one single antagonist (samples 3, 5 and 6). Samples 3, 5 and 6 have a total weight of antagonists of 1.0 mg, 0.2 mg respectively 1.0 mg. The three antagonists were applied in the same proportionate level as in samples 7 and 8. A total of 4 samples were provided having total levels of three antagonists comparable to the level of only one antagonist. These samples were numbered samples 41-44.

TABLE 7

| | Samples prepared according to Example 3. | | | | |
|---|---|---|---|---|---|
| | Nicotine mg (25-01) | Nicotine mg (25-02) | Eucalyptol mg (34-06) | Camphor mg (34-02) | WS-12 mg (25-07) |
| Sample 41 | 1 | — | 0.14 | 0.14 | 0.71 |
| Sample 42 | 1 | — | 0.03 | 0.03 | 0.14 |

TABLE 7-continued

Samples prepared according to Example 3.

|  | Nicotine mg (25-01) | Nicotine mg (25-02) | Eucalyptol mg (34-06) | Camphor mg (34-02) | WS-12 mg (25-07) |
|---|---|---|---|---|---|
| Sample 43 | — | 2 | 0.14 | 0.14 | 0.71 |
| Sample 44 | — | 2 | 0.03 | 0.03 | 0.14 |

Amounts given in mg. The level of antagonists in mg of Sample 41 and Sample 43 correspond to the level of Samples 3 and 6. The level of antagonists in mg of Sample 42 and Sample 44 correspond to the level of Sample 5.

Example 8A

Samples for Testing with the Same Size of Tablets

Samples 3-44 were made in the same way as in Example 3. However, instead of using 100 mg nicotine tablets in combination with fractions of antagonist tablets, giving a total amount of each sample of more than 100 mg, each sample 3-44 was contained in a single tablet of 100 mg with the same ratio and amount of antagonists as in samples 3-44 and the same amount of nicotine. These samples were numbered samples 45-78.

Example 9

Test Procedure

The samples made in the previous examples were tested according to a specific procedure for standardization purposes.

A sample was placed under the tongue and moisturized by moving the tongue gently from side to side (60 moves/min) until the sample was dissolved. Before the sample was placed under the tongue, the mouth was moisturized by gently moving the tongue around in the mouth after which excess saliva was swallowed. Upon placing the sample under the tongue, saliva was not swallowed for 60 seconds. Irritation from nicotine (such as nicotine burning in the mouth or hiccups in the stomach) and antagonist perception was evaluated each 30 seconds on a numerical rating scale ranging from 0 to 5.

The test set-up was composed of 8 test persons in a test panel. Each of the test persons were healthy individuals appointed on an objective basis according to specified requirements. The sensory analysis was performed according to ISO 4121-2003 in testing conditions following ISO 8589. The result is an average of the results of the 8 individuals. Each sample was subject to triple evaluation for each of the 8 test persons, giving a total of 24 measurements for each sample.

Example 10

Sensory Evaluation Test Set-Up

The test persons gave a rating from 0-5, where 0 is "no recognition of the parameter" and 5 is "highest recognition of the parameter".

The rating scale was applied as follows:
0=No irritation
1=Very low irritation
2=Low irritation
3=Medium irritation
4=High irritation
5=Worst imaginable irritation Four different parameters were tested in a test panel:

| Antagonist perception | Burning under tongue | Burning in oral cavity | Burning in the throat |
|---|---|---|---|

"Antagonist perception"—the overall impression of the sample during testing with respect to the antagonist. For instance, a very low antagonist perception gave a very low rating and an uncomfortable high antagonist perception gave a very high rating.

"Burning"—the overall impression of the irritation from nicotine in the composition during testing. For instance, if no burning was experienced under the tongue, a low rating was given and if immense irritation (burning) was experienced, a high rating was given.

Example 11

Sensory Evaluation Test Results

In general, the tests revealed that a combination of two or more antagonists provided a favorable effect on nicotine irritation (burning). With reference to the figures, while some reduction in nicotine irritation was experienced from use of single antagonists (such as in FIG. 2a and FIG. 2b), a more pronounced effect was seen for two antagonists (such as FIG. 4a), and even more pronounced for three antagonists (such as FIG. 3a).

Since the antagonists for a vast majority have an own taste that may cause antagonist perception involving huge discomfort in high concentrations, including eucalyptol and camphor, it was most surprising to the inventors that the combination of antagonists could reduce nicotine irritation to a degree as seen without causing a higher antagonist perception. In some instances, the antagonist perception was even significantly reduced for samples where nicotine irritation was diminished. This was seen even though the total amount of antagonist was much higher than for the tests where only single antagonists were applied.

The expectation of the inventors was that by adding a higher amount of antagonists (samples 7-8 and 17-40), the antagonist perception would be significantly higher compared to samples where only single antagonists were applied. This was seen for two antagonists but was surprisingly more pronounced for three antagonists. It was even more surprising that the nicotine irritation (burning) level was significantly reduced at the same time. Without being bound by theory, it appears that the combination of three antagonists works in synergy with nicotine for reducing nicotine irritation (burning).

Figure 4A:
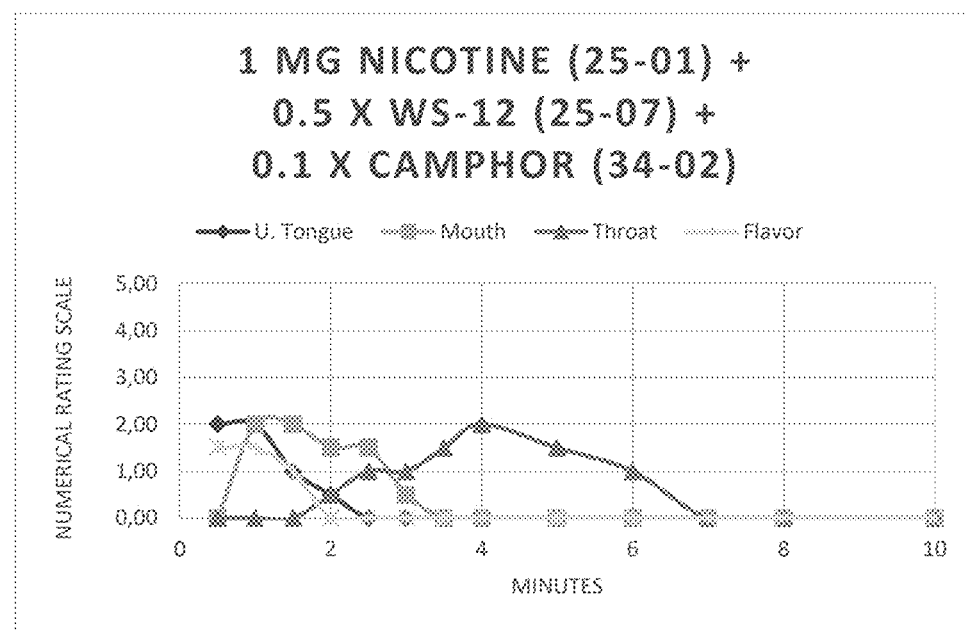
FIG. 4a shows a 1 mg nicotine tablet disclosed in FIG. 1a combined with 50% of a tablet with a content of WS-12 and 10% of a tablet with a content of camphor, but without nicotine.

Specifically, a combination of three antagonists (FIG. 3a) was seen to provide the best results on reduction of nicotine irritation. However, also for two antagonists, nicotine irritation was reduced according to the invention but to a less degree than for three antagonists (FIG. 4a). Without being bound by theory, it appears that the combination of two antagonists according to the invention also works in synergy with nicotine for reducing nicotine irritation (burning).

Further, the expectation of the inventors was that by adding a proportionate level of antagonists according to Example 8 (samples 41-44), the antagonist perception would be comparable with use of samples including only single antagonists. However, it was surprising that also for a proportionate levels of antagonists, the nicotine irritation (burning) level was significantly reduced. Without being bound by theory, it appears that the combination of antagonists also in this set-up works in synergy with nicotine for reducing nicotine irritation (burning).

Specifically, a combination of three antagonists according to Example 8 (samples 41-44) was seen to provide the best results on reduction of nicotine irritation. However, also for two antagonists, nicotine irritation was reduced according to the invention but to a less degree than for three antagonists.

The same results were seen for Samples 45-78 prepared according to Example 8A.

The invention claimed is:

1. An oral buffered nicotine product comprising:
   one or more nicotine sources selected from the group consisting of nicotine bitartrate, nicotine polacrilex resin, free base nicotine, and combinations thereof, constituting a total nicotine content of 0.5 to 20.0 mg in the oral buffered nicotine product;
   one or more buffering agents present in an amount of 1.0% to 5.0% by weight of the oral buffered nicotine product selected from the group consisting of potassium carbonate, potassium bicarbonate, sodium carbonate, sodium bicarbonate, potassium citrate, dipotassium phosphate, and combinations thereof; and
   an analgesic composition for alleviation of perceived nicotine irritation through inhibition or blocking of nicotine activated receptors or ion channels in the gastrointestinal tract, including the oral cavity, the composition comprising:
      at least two antagonists in an effective amount to inhibit or block nicotine agonist activation of Nicotinic Acetylcholine Receptors (nAChR) and/or Transient Receptor Potential (TRP) ion channels, the at least two antagonists being selected from the group consisting of:
         a first antagonist comprising camphor,
         a second antagonist comprising eucalyptol, and
         a third antagonist comprising (1R,2S,5R)-N-(4-Methoxyphenyl)-5-methyl-2-(1-methylethyl)cyclohexanecarboxamide (WS-12),
      wherein the at least two antagonists and nicotine are present in a weight ratio of 1:2 to 2:1, and wherein the at least two antagonists are present in a total amount effective to reduce perceived nicotine irritation by more than 20% compared to presence of only one of the same at least two antagonists in the same total amount, and wherein the unit weight of the oral buffered nicotine product is from 50 to 2000 mg.

2. The oral buffered nicotine product according to claim 1, wherein the at least two antagonists comprise the first antagonist and the second antagonist in a weight ratio of 1:20 to 1:1.

3. The oral buffered nicotine product according to claim 1, wherein the at least two antagonists comprise the first antagonist and the third antagonist in a weight ratio of 1:20 to 1:1.

4. The oral buffered nicotine product according to claim 1, wherein the at least two antagonists comprise the second antagonist and the third antagonist in a weight ratio of 1:4 to 4:1.

5. The oral buffered nicotine product according to claim 1, wherein the at least two antagonists comprise the first antagonist, the second antagonist and the third antagonist in a weight ratio of 1:20:20 to 1:1:1.

6. The oral buffered nicotine product according to claim 1, wherein the at least two antagonists are present in a total amount effective to reduce peak perceived nicotine irritation in the oral cavity by more than 20% compared to presence of only one of the same at least two antagonists in the same total amount.

7. The oral buffered nicotine product according to claim 1, wherein the at least two antagonists are present in a total amount effective to alleviate peak perceived nicotine irritation in the oral cavity and reducing peak antagonist perception by more than 30% compared to presence of only one of the same at least two antagonists in the same total amount.

8. The oral buffered nicotine product according to claim 1, wherein the at least two antagonists are present in a total amount effective to alleviate peak perceived nicotine irritation in the throat and reducing peak antagonist perception by more than 30% compared to presence of only one of the same at least two antagonists in the same total amount.

9. The oral buffered nicotine product according to claim 1, wherein the at least two antagonists inhibit or block nicotine agonist activation of receptors or ion channels selected from the group consisting of Nicotinic Acetylcholine Receptors (nAChR), Transient Receptor Potential Vanilloid Type 1 (TRPV1) ion channels, Transient Receptor Potential Ankyrin 1 (TRPA1) ion channels, Transient Receptor Potential Melastatin 8 (TRPM8) ion channels, and combinations thereof.

10. The oral buffered nicotine product according to claim 1, wherein the at least two antagonists are present in a total amount effective to reduce peak perceived nicotine irritation in the oral cavity by more than 20% without causing higher peak antagonist perception compared to presence of only one of the same single antagonists in the same individual amount.

11. The oral buffered nicotine product according to claim 1, wherein the at least two antagonists are present in a total amount effective to reduce peak perceived nicotine irritation in the throat by more than 20% without causing higher peak antagonist perception compared to presence of only one of the same single antagonists in the same individual amount.

12. The oral buffered nicotine product according to claim 1, wherein the oral buffered nicotine product comprises one or more sugar alcohol particles in an amount of at least 40% by weight of the oral buffered nicotine product.

13. The oral buffered nicotine product according to claim 1, wherein the oral buffered nicotine product further comprises a disintegrant in an amount of 1% to 10% by weight of the oral buffered nicotine product.

14. The oral buffered nicotine product according to claim 1, wherein the oral buffered nicotine product is a tablet.

15. The oral buffered nicotine product according to claim 1, wherein the oral buffered nicotine product is an orally disintegrating tablet.

16. The oral buffered nicotine product according to claim 1, wherein the oral buffered nicotine product is a chewing gum.

17. The oral buffered nicotine product according to claim 1, wherein the oral buffered nicotine product is a compressed chewing gum.

18. The oral buffered nicotine product according to claim 1, wherein the oral buffered nicotine product is a pouch.

* * * * *